United States Patent [19]
Ito et al.

[11] Patent Number: 4,920,377
[45] Date of Patent: Apr. 24, 1990

[54] COPYING APPARATUS CAPABLE OF AUTOMATICALLY SELECTING COPY PAPER SIZE AND CONTROL METHOD FOR CONTROLLING OPERATION OF COPYING APPARATUS

[75] Inventors: Masazumi Ito; Tomoji Murata, both of Osaka, Japan

[73] Assignee: Minolta Camera Kabushiki Kaisha, Osaka, Japan

[21] Appl. No.: 308,181

[22] Filed: Feb. 8, 1989

[30] Foreign Application Priority Data

| | | | |
|---|---|---|---|
| Feb. 10, 1988 | [JP] | Japan | 63-29869 |
| Feb. 15, 1988 | [JP] | Japan | 63-32491 |
| Feb. 15, 1988 | [JP] | Japan | 63-32492 |
| Feb. 15, 1988 | [JP] | Japan | 63-32493 |
| Feb. 18, 1988 | [JP] | Japan | 63-36387 |
| Feb. 18, 1988 | [JP] | Japan | 63-36388 |
| Feb. 18, 1988 | [JP] | Japan | 63-36389 |
| Feb. 18, 1988 | [JP] | Japan | 63-36390 |

[51] Int. Cl.[5] ............ G03B 27/52
[52] U.S. Cl. ............ 355/55
[58] Field of Search ............ 355/55, 3, 14

[56] References Cited

U.S. PATENT DOCUMENTS

| | | | |
|---|---|---|---|
| 4,017,173 | 4/1977 | Komori et al. | 355/8 |
| 4,302,098 | 11/1981 | Kan et al. | 355/55 |
| 4,618,252 | 10/1986 | Hisajima et al. | 355/55 |
| 4,647,188 | 3/1987 | Komiya et al. | 355/55 |
| 4,669,858 | 6/1987 | Ito et al. | 355/8 |
| 4,743,944 | 5/1988 | Tomosada et al. | 355/55 |
| 4,752,809 | 6/1988 | Ito | 355/14 R |
| 4,804,997 | 2/1989 | Mizude et al. | 355/14 SH |
| 4,814,824 | 3/1989 | Ito et al. | 355/55 X |

*Primary Examiner*—Donald A. Griffin
*Attorney, Agent, or Firm*—Willian, Brinks, Olds, Hofer, Gilson & Lione

[57] ABSTRACT

A copying apparatus capable of automatically reproducing an image at different magnifications without operator's paper selections as well as automatically making a copy of a selected area of a document with an optimum size. The apparatus comprises an image forming device having a plurality of copying modes; paper feeding devices accommodating copy paper sheets of different size; a copying mode selecting mechanism; and a paper feeder selecting mechanism, wherein the selection is effected in response to the selection of the copying mode, regardless of a size of a document.

A control method capable of automatically reproducing an image at different magnifications without operator's paper selection as well as automatically making a copy of selected area of a document with an optimum size. The method comprises the steps of: selecting a copying mode; designating a copy paper size corresponding to the selected copying mode; selecting the copy paper sheet if there is a copy paper sheet with the designated size in an automatic paper feeder; and indicating a request of feeding manually its copy paper sheet if there is no copy paper sheet in the automatic paper feeder.

18 Claims, 22 Drawing Sheets

COPYING APPARATUS CAPABLE OF AUTOMATICALLY SELECTING COPY PAPER SIZE AND CONTROL METHOD FOR CONTROLLING OPERATION OF COPYING APPARATUS

BACKGROUND OF THE INVENTION

1. Field of the Invention

The present invention generally relates to a copying apparatus, and more particularly to a copying apparatus which is capable of automatically selecting a size of a copy paper sheet.

2. Description of the Related Art

Conventionally, there are provided copying machines which are capable of carrying out a copying operation at a desirable magnification ratio which is selected out of a plurality of available magnification ratios which are predeterminedly fixed. The fixed magnification ratios, for example, may be 0.707-magnification, 0.865-magnification and 1.414-magnification. These magnifications are determined so as to correspond to enlargement and/or reduction between regular-sized sheets. That is, 0.707-magnification is applied to reduction from A3-size to A4-size(at longitudinal position), 0.865-magnification is applied to reduction from A3-size to B4-size( at longitudinal position ), and 1.414-magnification is applied to enlargement from A4-size (at longitudinal position) to A3-size.

As described above, the magnification ratio of "×0.707" corresponds to a reduction-copying between the A3-sized and A4-sized regular sheets. Therefore, the magnification ratio of "0.707" is usually selected, assuming that the reduction from A3-size to A4-size at its longitudinal position is performed. To this end, the copying machine automatically selects the A4-sized copy paper sheet which is positioned longitudinally in case where the magnification ratio of "0.707" is selected.

The above-mentioned disadvantage is caused at selection of another copying mode as well as at the selection of the magnification. For example, when a copying mode of copying from two originals on a document platen to an individual copy paper sheet (it is a so-called book mode) is performed, it is necessary for some users to take an action for selecting the A4-sized sheet positioned sideways in addition to taking an action for the selection of the copying mode every time the book mode is selected, nevertheless they always use the A4-sized sheet positioned lengthwise. Furthermore, in an edition mode representative of copying an only image of an optional area which is assigned in the original, it is necessary to select the copy paper sheet having the size suitable for copying the image of the fixed area every time the area is fixed.

SUMMARY OF THE INVENTION

Accordingly, a first object of the present invention is to provide an improved copying apparatus having easy handling in operation.

A second object of the present invention is to provide an improved copying apparatus not requiring an operation of selecting copy paper sheet by an operator.

In accomplishing these and other objects, according to the present invention, there is provided an improved copying apparatus which comprises: an image forming means having a plurality of copying modes which are correlated with predetermined copy paper sizes, respectively; a plurality of paper feeding means, each of which accommodates copy paper sheets of which the sizes are different from each other; a first selection means for manually selecting one of the copying modes; and a second selection means for automatically selecting one of the paper feeding means in which the copy paper sheets having the size correlated with the copying mode selected by the first selection means are accommodated, wherein the selection of the paper feeding means is effected, regardless of a size of an original document, in response to the selection of the copying mode.

In carrying out the present invention in one preferred mode, one of the copying modes is equivalent to a copying operation at different copy magnifications. In such a case, the respective magnification ratios have the respective predetermined sizes of the copy paper sheet, correspondingly. Therefore, when an operator selects one magnification ratio, the apparatus automatically feeds the copy paper sheet, the size of which is optimum, regardless of the size of the original document. Consequently, the copying operation is quite easy for the operator as well as no selection of the copy paper sheet at enlargement/reduction copying is requested to the operator.

According to ,one preferred embodiment of the present invention, the apparatus is so constructed that a second selection means automatically selects one of the paper feeding means in which the copy paper sheets having a specified size are accommodated, wherein the selection of the paper feeding means is effected in response to the selection of the second mode, regardless of a size of the original document. In this case, if the copying modes are equivalent to a first copying mode and a second copying mode, the first copying mode representing that an image of an original document on a platen glass is formed onto a copy paper sheet, i.e., it is a so-called normal copying mode, and the second copying mode representing that each image of two original documents on the platen glass is formed onto an individual copy paper sheet, i.e., it is a so-called book copying mode applied for copying from an opened book, the apparatus automatically forms each image of the two documents on the platen glass onto an individual copy paper sheet when the operator selects the second mode. Consequently, in this apparatus, the copying operation is quite easy for the operator as well as no selection of the copy paper sheet at book copying is requested to the operator.

Further, according to one preferred embodiment of the present invention, the above-mentioned paper feeding means comprises a first paper feeding means including a plurality of paper feeding units, each of which accommodates copy paper sheets, for automatically feeding the copy paper sheet therein to the image forming means one by one in response to a signal of paper feeding and a second paper feeding means for feeding a copy paper sheet to be manually set therein to said image forming means. Further, the above-mentioned second selection means comprises a sheet size designating means for designating a copy paper size which is correlated with the copying mode selected by the first selection means and a means for automatically selecting one of the first and second paper feeding units in which the copy paper sheets with the size designated by the sheet size designating means are accommodated. And, the apparatus further comprises an indication means for indicating a request of setting a copy paper sheet at the second paper feeding means when there is no copy paper sheet with the size designated by said sheet size designating means in the first paper feeding means. In this apparatus, if the copy paper sheets with the optimum size are not accommodated, in the copying apparatus, the apparatus gives an indication that there are no copy paper sheets with the optimum size for copying through the indication means. Consequently, the operator always carries out copying with the optimum size of the copy paper sheet.

In accomplishing an operation of the above-mentioned apparatus, according to the present invention, there is provided an improved control method for controlling an operation of a copying apparatus having automatic paper feeding means and manual paper feeding means, comprising the steps of: selecting a copying mode; designating a copy paper size which is correlated with the selected copying mode; selecting the automatic paper feeding means for paper feeding if there is a copy paper sheet with the designated size in the automatic paper feeding means; and indicating a request of setting a copy paper sheet at the manual paper feeding means if there is no copy paper sheet with the designated size in the automatic paper feeding means.

According to the control method described above, the copying operation is controlled so as to automatically feed the the copy paper sheet, the size of which is always optimum. Therefore, the operator is freed from the operation of selecting the size of the copy paper sheet. If the apparatus has no copy paper sheets therein, such information is given to the operator automatically, so that the operator may feed the copy paper sheet manually. Therefore, the control method according to the present invention achieves an easy and simple operation to the operator, resulting in that careless copying mistakes can be effectively prevented.

As is apparent from the foregoing descriptions, as the copying mode, several modes are applicable thereto. For instance, one is a copy magnification, and another is a copying mode on enlargement/reduction of an assigned area in an original, and still another is a special copying mode like copying from an opened book described previously.

In the apparatus described previously, there are provided some preferred modes in carrying out the present invention.

For example, in the apparatus having the first and second paper feeding means and the indication means, it is so constructed that the first selection means selects one of the copying magnifications as one of copying modes and the second selection means designates a copy paper size which is predeterminedly correlated with the copying magnification selected by the first selection means and automatically selects one of the first and second paper feeding units in which the copy paper sheets with the size designated by the sheet size designating means are accommodated, wherein the selection of the copying magnification is effected in response to the selection of the copying magnification, regardless of a size of a document. In this case, the apparatus automatically selects the copy paper sheet with the optimum size corresponding to the selected magnification, or the apparatus gives an indication that an operator has to set the copy paper sheet with optimum size in the second paper feeding means to the operator. Therefore, the operator only takes an action of setting the sheet with the indicated size, so that he can make a copy without any failure. Accordingly, there is no need to exchange a cassette or the like.

If the copying mode has the first and second modes previously described and the apparatus provides a mode selection means for selecting either the first or second mode, as previously described, a copy paper sheet with the specified paper size is automatically selected when the second mode is selected. And if there are not that sheets of the specified size in the first paper feeding means, the apparatus gives an indication that an operator has to set that sheet in the second paper feeding means.

Further, the present invention provides a copying apparatus which comprises: an image forming means having a plurality of copying modes; a paper feeding means including a plurality of paper feeding units, each of which accommodates copy paper sheets, for automatically feeding the copy paper sheet therein to the image forming means one by one in response to a signal of paper feeding; a first selection means for selecting a copying mode; a first designating means for designating a first copy paper size, on the basis of a first rule, in response to the selection of the copying mode; a second designating means for designating a second copy paper size on the basis of a second rule when there is no copy paper sheet with the first size in the paper feeding means; and a second selection means for automatically selecting one of the paper feeding units in which the copy paper sheets with the designated size are accommodated.

In carrying out the present invention in one preferred mode, a copy, magnification can be selected as one of the copying modes, or either the first or second mode previously described can be selected as one copying mode. In response to the selection of the copying mode, the size of the copy paper sheet is designated, wherein the selection is effected on the basis of the first rule. The first rule, for example, represents a TABLE which provides a relationship between the magnification ratio and the paper size, or a specified size. The above-mentioned second rule, for example, represents that a one rank-up size may be selected. Accordingly, if the copy paper sheet with the selected size is not available in the paper feeding means, the copy paper sheet having a larger size than the selected one is automatically selected and fed to the image forming means. Therefore, an operator gets a copied sheet with the complete original image. That is, in this apparatus, there is no need to decide the size of the copy paper sheet to be used on the occasion of the enlargement/reduction copying and the like, resulting in that operation time can be reduced. In addition the operator avoids the necessity of looking for the copy paper sheet or exchanging a cassette.

Still further, according to one preferred embodiment of the present invention, there is provided a copying apparatus which includes the first and second paper feeding means, the second selection means, and the indication means, all of which are previously described, comprising; an area assignation means for assigning an optional area in an original on a document platen, an image forming means capable of forming an image of the assigned area, and sheet size designating means for designating a copy paper size which corresponds to the assigned area. In this apparatus, the copy paper sheet with the size corresponding to the area is automatically selected. On the other hand, if the sheet is not in the first paper feeding means, the apparatus indicates that a sheet to be set in the second paper feeding is required through the indication means.

Alternatively, an apparatus, having an area assignation means and an image forming means described above, a paper feeding means having a plurality of paper feeding units and a second selection means which are previously described, further includes a first and second sheet size designating means, instead of the foregoing means, wherein the first means designates a first copy paper size which corresponds to the assigned area and the second means designates a second copy paper size when there is no copy paper sheet with the first size in the paper feeding means. In the case of the apparatus constructed above, there is no more need of the indication means previously described since the second size, for example one rank-up size of the first size, of the copy paper sheet is automatically selected if there is no copy paper sheet with the first size in the paper feeding means.

Further alternatively, in carrying the present invention in one preferred mode, an apparatus comprises: an area assignation means for assigning an optional area in an original on a document platen; an image forming means capable of forming an image of the original with a first mode and a second mode, the first mode representing to form the image of the whole original and the second mode representing to form the image of the assigned area in the original; a selection means for selecting one of the first and second modes; a paper feeding means including a plurality of paper feeding units, each of which accommodates copy paper sheets, for automatically feeding the copy paper sheet therein to the image forming means one by one in response to a signal of paper feeding; a sheet size designating means for designating a copy paper size which corresponds to the assigned area when the second mode is selected; and a control means for controlling the apparatus so as to cancel the second mode when there is no copy paper sheet with the designated size in the paper feeding units. If there is no copy paper sheet with the designated size in the paper feeding units, the second mode is cancelled, so that incomplete copying such as copying with lack of the image can be effectively prevented. Therefore, on the occasion of the copying operation with selection of this copy mode, it is not necessary for an operator to decide a size of the copy paper sheet to be used, resulting in that the operation time is reduced.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE PREFERRED EMBODIMENTS

Figure 1:
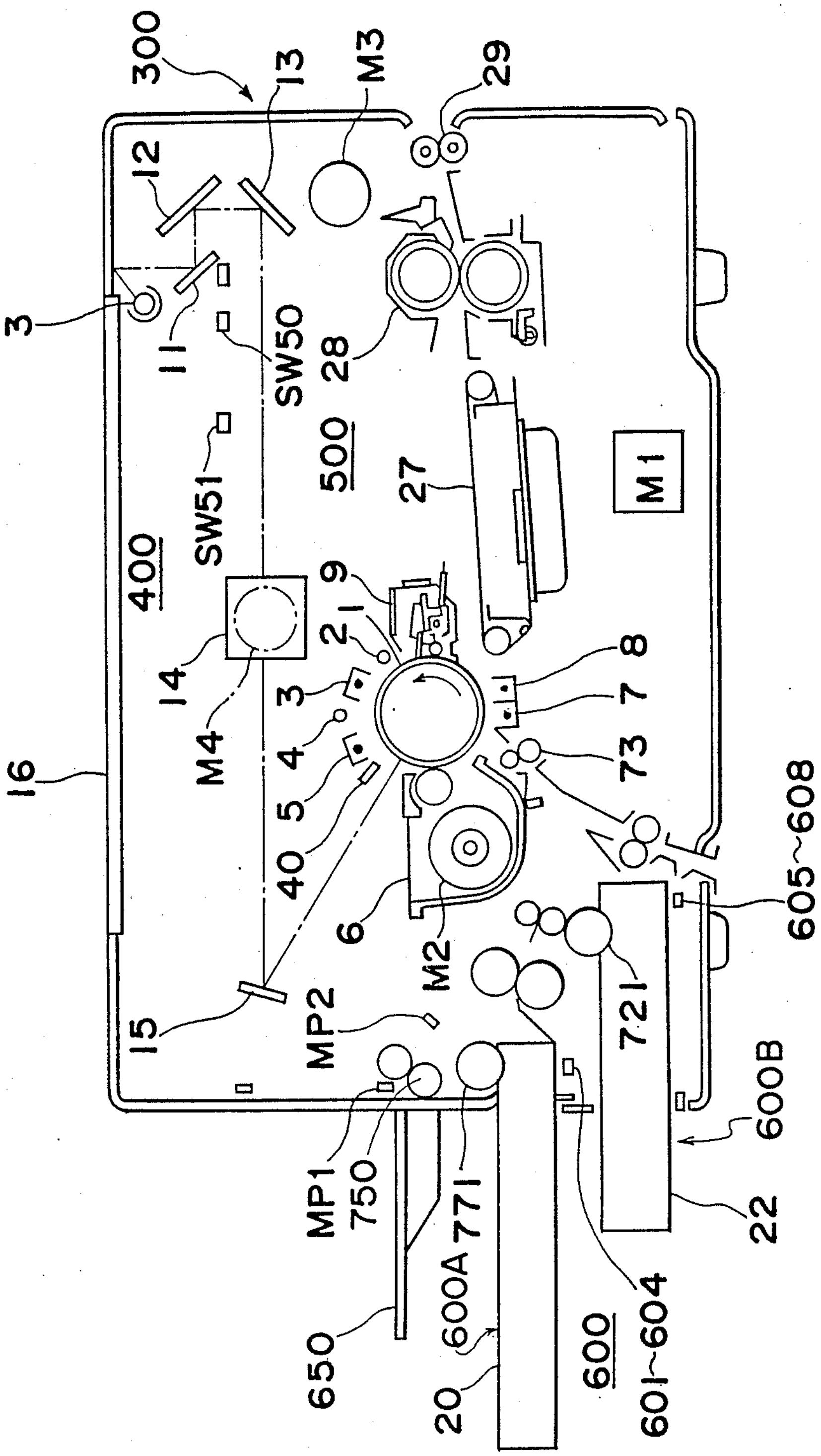
FIG. 1 is a schematic diagram showing an electrophotographic copying machine embodying the present invention.

Before the description of the embodiment proceeds, it is to be noted that like parts are designated by like reference numerals and symbols throughout the several views of the accompanying drawings.

Copying Mechanism

Referring now to the drawing of FIG. 1, there is shown an electrophotographic copying machine to which the present invention is applicable comprising an optical system 400, an image forming system 500, an automatic paper feeding device 600 and a manual paper feeding device 650. The optical system 400 is disposed at an upper portion of a machine housing 300 and the image forming system 500 is disposed at a lower portion of the machine housing 300. Further, the automatic paper feeding device 600 and the manual paper feeding device 650 are, respectively, disposed at a left-hand portion of the machine housing 300.

The optical system 400 is designed in such a manner that an original positioned on a transparent original support glass 16 is exposed and scanned so that a reflected light image of the original is focussed on an outer surface of a photosensitive drum 1 which is one of members of the image forming system 500. More specifically, the optical system 400 comprises a fluorescent lamp 3 for exposing, a plurality of movable mirrors 11, 12, 13 and 15, and a projector lens assembly 14. The exposure lamp 3 and the movable mirror 11 and both of mirrors 12 and 13 are adapted to be driven by a motor M3 in such a way that both of the exposure lamp 3 and the mirror 11 and both of the mirror 12 and 13 can be moved leftwards, as viewed in FIG. 1, at a speed of V/N and V/2N, respectively, wherein V represents the peripheral velocity of the photosensitive drum 1 and N represents a magnification. These members 3, 11, 12, 13 travel underneath the original glass 16 in both directions so that the original on the glass 16 may be exposed and scanned. Setting of the magnification and correction of focussing are carried out by position adjustment of both the lens assembly 14 and the mirror 15 and angle adjustment of the mirror 15, respectively. It is to be noted that these adjustment are effected by driving of a motor M4. In addition, reference numerals SW50 and SW51 designate sensors for detecting positions of the movable elements of the optical system 400.

The image forming system 500 is a system by which an image formation under a so-called electrophotographic processing is performed. In other words, the system 500 is designed in such a way that an electrostatic latent image formed on the photosensitive drum 1 is developed by toner and is transferred onto a copy paper sheet and fixed thereon, then the copied sheet is discharged.

The image forming system 500 comprises the photosensitive drum 1 supported at a generally central position within the machine housing 300 for rotation in a direction counterclockwise as viewed in FIG. 1. The system 500 further comprises eraser lamps 2 and 4, electrostatic chargers 3 and 5, a developing device 6 which is driven by a motor M2, a transfer charger 7, a separator charger 8 and a cleaning device 9, all of which are disposed adjacent to and around the drum 1. Furthermore, the unit 500 comprises a transporting belt 27 for transporting the copy paper sheet on which the image is transferred, a fixing device 28 for fixing a toner image on the copy paper sheet which is transported by the belt 27 and a pair of rollers 29, 29 for discharging the copy paper sheet which has been fixed from the image forming system 500.

It is to be noted that a reference numeral 73 designates a pair of timing rollers by which the copy paper sheet to be fed is supplied to a spacing between the drum 1 and the transfer charger 7 at a predetermined timing as well as in synchronism with a rotation of the drum 1, and a symbol M1 designates a main motor.

The automatic paper feeding device 600 has two independent paper feeders 600A and 600B, one 600A of which comprises a first paper feeding tray 20, a first feeding roller 771 and two pairs of guide rollers without a reference numeral, and the other 600B of which comprises a second paper feeding tray 22 and a second feeding roller 721. The first, and second trays 20, 22 accommodate copy paper sheets the sizes of which are different from each other. The sheets in each tray 20 and 22 are drawn by the corresponding feeding roller 771 or 721, sequentially, then the sheets are fed to a pair of timing rollers 73 disposed in the image forming system 500. After that, the sheets are supplied to the spacing between the drum 1 and the transfer charger 7 in synchronism with a rotation of the drum 1 in response to a predetermined timing signal from a control unit 201 (FIG. 6) for controlling the optical system 400, then the abovedescribed image formation processing is effected. Under the respective trays 20, 22, a group of sensors 601, to 604, 605 to 608 is disposed, each of which is provided for detecting a size of the copy paper sheet accommodated therein.

Moreover, the copying machine has another paper feeding means by which a sheet to be set manually thereon is fed to the image forming system 500. That is, a manual paper feeding device designated by the reference numeral 650 is disposed above the automatic paper feeding device 600. The copy paper sheet to be set on the manual paper feeding device 650 is detected by a first sensor MP1 and its transportation is detected by a second sensor MP2. These sensors MP1 and MP2 are arranged at suitable positions for detecting the sheet. That is, the first sensor MP1 is disposed in front of a pair of paper feed rollers 750, 750 arranged close to an inlet for manual paper feeding in the housing 300. The second sensor MP2 is disposed behind the paper feed rollers 750, 750.

Control Apparatus

Figure 2:
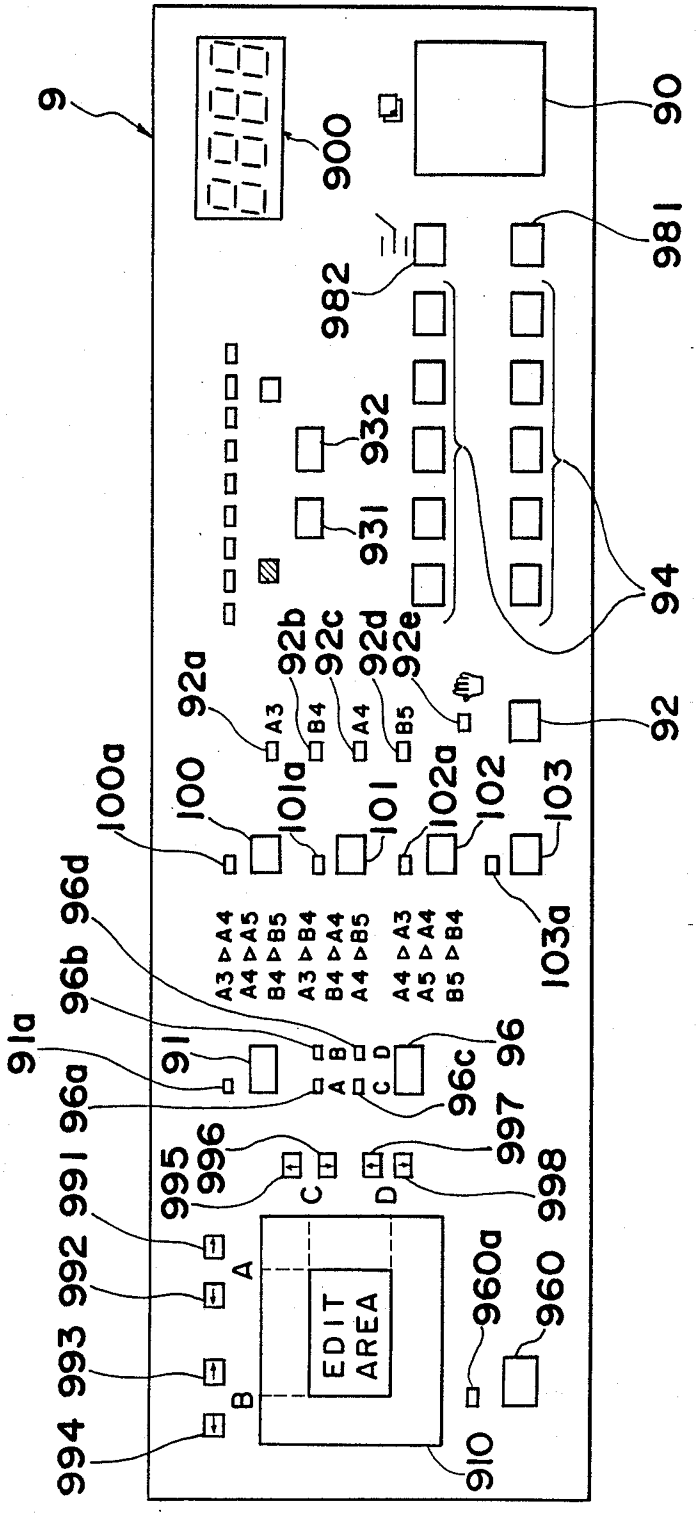
FIG. 2 is an elevational view showing an operation panel of the machine.

The manner in which various operation keys are arranged in an operation panel 9 of the copying machine is illustrated in FIG. 2. The copying machine according to the present invention has a function of editing. There are arranged an edition area displaying board 910 for indicating a edition area, an edition mode key 960 for ordering edition mode setting and a edition mode indication LED **960*a* for indicating that a mode is set to the edition mode, on the left side of the panel 9 as viewed in the drawing. On the panel 9, there are further arranged a key 96 for sequentially assigning inputted data of a co-ordinate for editing to each co-ordinate A,B,C,D on the edition area displaying board 910 and inputted co-ordinate indication LEDs 96*a* to 96*d* for indicating co-ordinates assigned thereby. Keys designated by numeral references 991 to 998** are for making fine adjustment of the inputted data of co-ordinates for editing.

At a central portion on the operation panel 9, there are further arranged a book mode key 91 for ordering book mode setting, an indication LED **91*a* for indicating that a mode is set to the book mode, magnification keys 100, 101, 102, and 103, which represent ×0.707-magnification, ×0.865-magnification, ×1.414-magnification, and ×1.000-magnification respectively, for inputting a copy magnification to be desired, indication LEDs 100*a* to 103*a* for indicating the copy magnification inputted by the respective keys 100 to 103 described above, a copy paper selecting key 92 for selecting one of the automatic paper feeders 600A and 600B, copy paper size indication LEDs 92*a* to 92*d* for indicating a size of the copy paper sheet which is accommodated in the selected automatic paper feeder 600A or 600B, and an indication LED 92*e* of manual paper feeding for indicating a request of performing paper feeding from the manual paper feeding device 650**.

There are still further arranged, at a right-hand portion on the operation panel 9, a digital display device 900 capable of displaying a copy quantity or the copy magnification with a numerical figure comprised of up to four digits, a print key 90 for initiating the copying operation, a group of numerical input keys 94, i.e., a so-called ten keys, for inputting numerical data of the copy quantity or data of the co-ordinates, density setting keys 931 and 932 for setting a copy density, an interruption key 982 for specifying an interrupted copying operation, and a clear/stop key 981.

Figure 3:
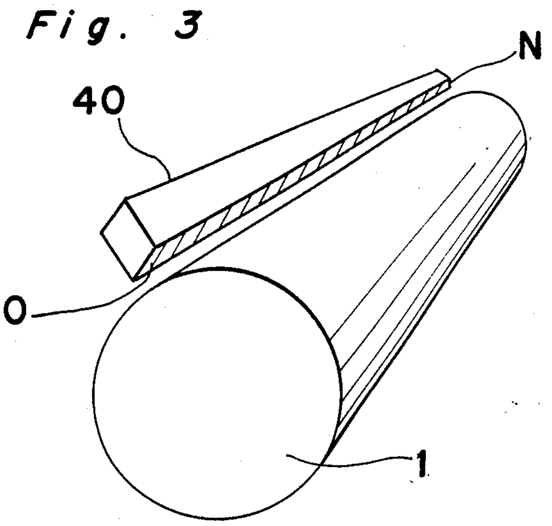
FIG. 3 is a perspective view explaining the relationship between locations of a photosensitive drum and an inter-image eraser unit.
Figure 4:
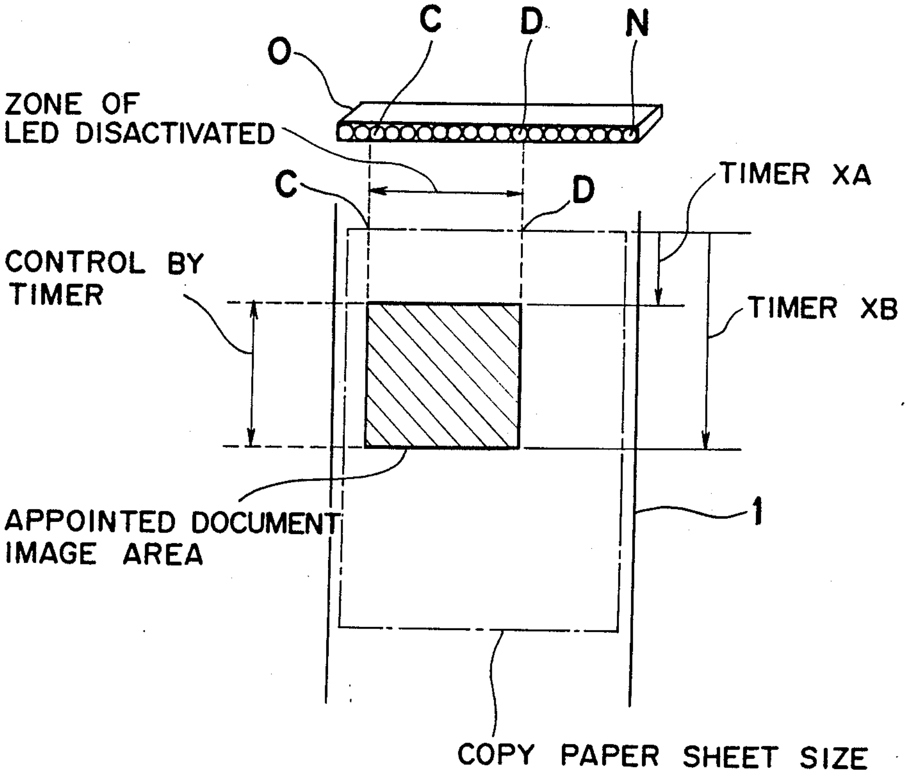
FIG. 4 is a diagram showing the relationship between an edition area and a range of an image to be erased by the inter-image eraser.

The drawing of FIG. 3 is a perspective view showing an inter-image eraser unit 40 which is disposed adjacent to the photosensitive drum 1 and the drawing of FIG. 4 is a diagram showing a mechanism of erasing charges which correspond to the designated area on the drum 1 by the inter-image eraser unit 40. As shown in the drawings, the inter-image eraser unit 40 has a LED-array which comprises a lot of LED elements individually controllable to be caused to be on or off individually. The unit 40 removes charges of the corresponding area on the drum 1 by emitting the LED-elements with a predetermined light quantity from the LED elements, wherein the LED-elements correspond to the area where an image formation is not carried out. For example, as shown in FIG. 4, it is assumed that the array includes the LED-elements of a number of N+1 and different symbols, e.g., 0, A, B, . . . , N, are given to respective LED-elements from the left-hand side of the line. All of the LED-elements are caused to be on until time-up time of a timer XA, then, from the time-up time of the timer XA until time-up time of a timer XB, the LED-elements having the symbols 0 to C and D to N are caused to be on. After that, all of the LED-elements are caused to be on from the time-up time of the timer XB. In case where such an operation is effected, an electrostatic latent image can be formed only in the area with an oblique line in FIG. 4. Accordingly, the image formation is not effected in an area out of the above-mentioned area.

Figure 5:
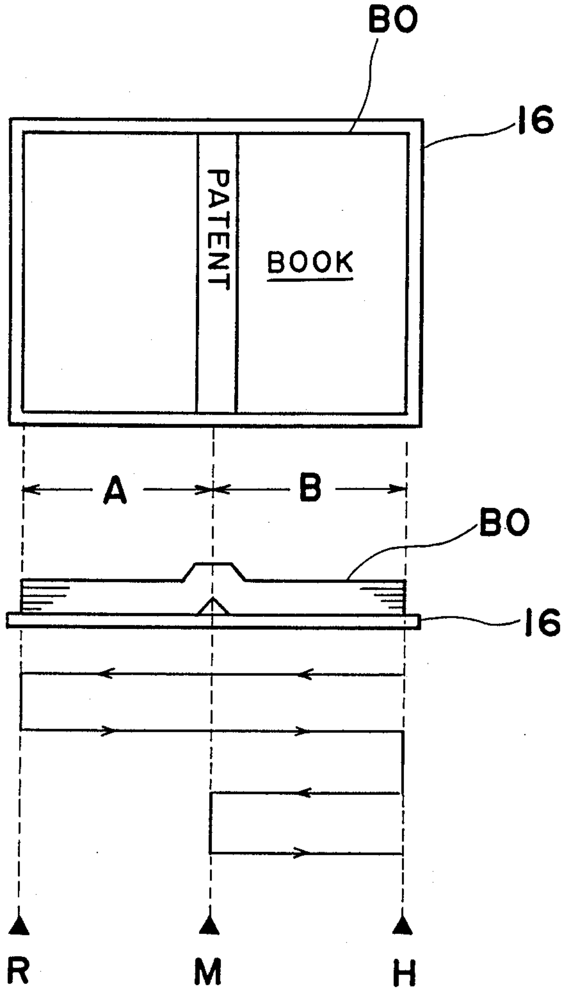
FIG. 5 is a schematic diagram showing a procedure of a book mode copying operation.

The drawing of FIG. 5 is a view showing the copying operation under the book mode. In this mode, two original documents set on the document platen glass 16 adjacent to each other are reproduced onto an individual copy paper sheet. For example, when a book shaped original document BO is set on, the platen glass 16 in an open state and the print key 90 is depressed, the reflection mirror 12 moves from its home position (H) to its return position (R), first. During this operation, an original image of an area away from the home position (H) is reproduced onto a first copy paper sheet. Subsequently to the above, the reflection mirror 12 returns to the home position (H) from the return position (R) once, and then the reflection mirror 12 moves from the home position (H) to a middle position (M) of the document again. During this operation, an original image of an area close to the home position (H) is reproduced onto a second copy paper sheet.

Figure 6:
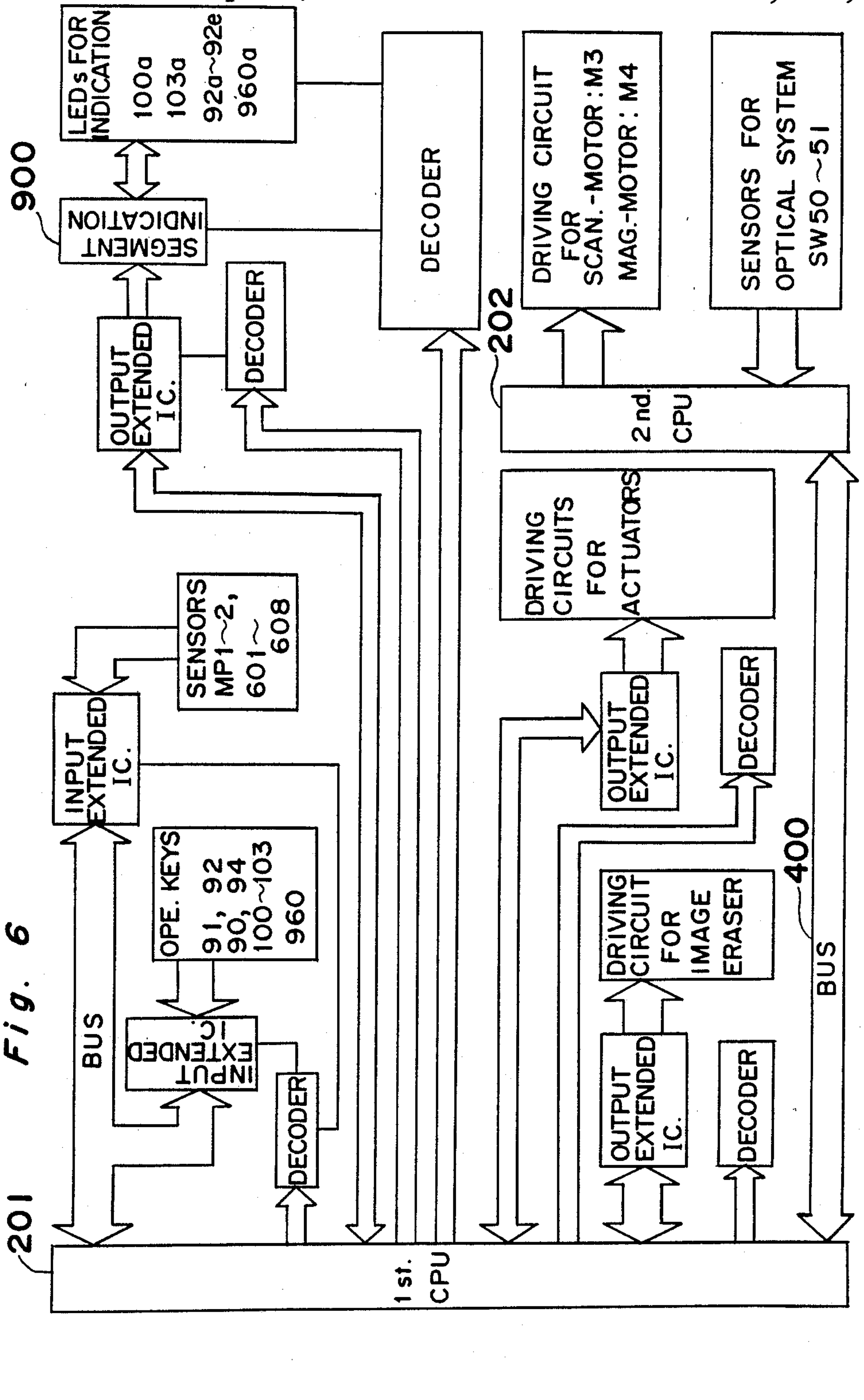
FIG. 6 is a diagram showing a control circuit of the machine.

Referring now to FIG. 6, there is shown a control circuit for controlling an operation of the copying machine and the optical system. The control circuit is mainly constructed with a first CPU 201 controlling the image forming system 500 and paper feeding, and a second CPU 202 controlling the optical system 400.

Various kinds of signals from the respective keys on the operation panel 9 and the respective sensors disposed therein for detecting the operating condition of the machine are inputted into the first CPU 201 through an input extended IC, respectively. Moreover, the first CPU 201 outputs control signals for controlling driving circuits for actuators disposed in the machine, such as the main motor M1, the developing motor M2, respective clutches(not shown), and chargers 3, 5, 7, 8, a control signal for controlling a driving circuit 400 of the inter-image eraser 40, and control signals for controlling driving circuits of LED-elements for indication and of the display unit 900 through an output extended IC. The first CPU 201 is connected with the second CPU 202 through a bus 400 and both CPUs 201, 202 are in communication with each other. Signals from the sensors SW50 and SW51, disposed in the optical system 400, for detecting a state of scanning and so on are inputted into the second CPU 202 and the CPU 202 outputs control signals for controlling driving circuits of the scanning motor M3 and the magnification setting motor M4.

Figure 7:
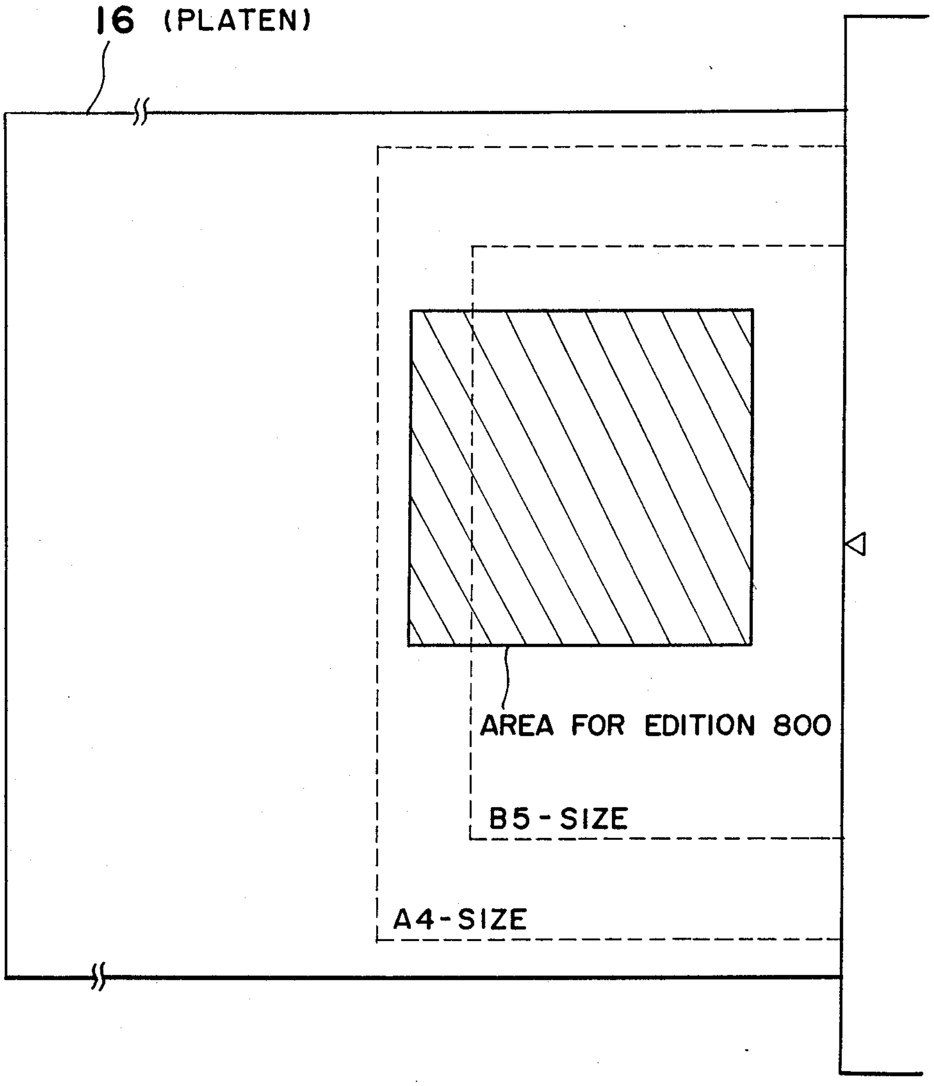
FIG. 7 is a diagram illustrating sheet size determination of a copy paper sheet by fixing an edition area.

According to the drawing of FIG. 7 in which is shown an edited area 800 on the platen glass 16, the relationship between the edition area 800 to be copied and a copy paper size can be explained as below. That is, the edition area 800 as shown in the drawing is beyond the B5-sized area (shown by a dotted line) but within the A4-sized area (shown by another dotted line), wherein both sized areas are positioned sideways with respect to the paper feeding direction. In this case, therefore, the A4-sized sheet must be selected so that a complete copying without any lack of printed images may be fulfilled. As it is apparent from the description mentioned above, the size of the copy paper sheet can be designated univocally if the edition area is determined.

Copying Operation

Figure 8:
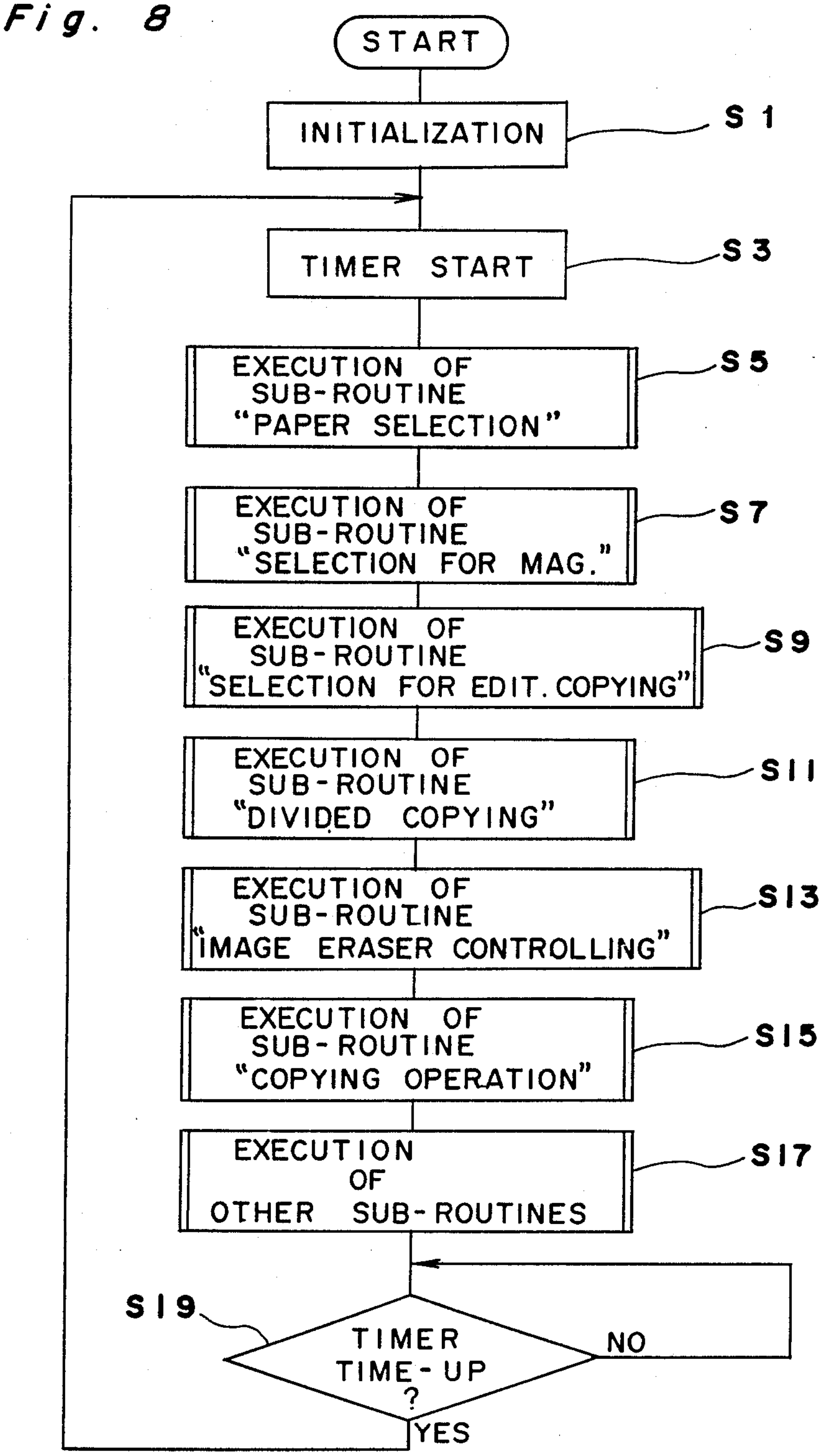
FIG. 8 is a flow-chart showing a main process to be performed by a first CPU.

In FIG. 8, there is shown a flow chart of a main routine executed by the first CPU 201. Before an explanation of the flow chart is performed, terms of "on-edge" and "off-edge" are defined as below.

The on-edge is defined as a change of a state which happens when an operating state of a switch, a sensor, a signal, or so on changes from the off-state to the on-state. On the other hand, the off-edge is defined as a change of a state which happens when an operating state of a switch, a sensor, a signal, or so on changes from the on-state to the off-state.

Now, going back to the explanation of the flow chart, the first CPU 201 initiates processings when, for example, an electric power is supplied. At first, initialization of the first CPU 201 is made at step S1. Then, an internal timer by which a required time for one routine is controlled is set at step S3, and the processings at respective steps of step S5 to step S17 are executed sequentially. After that, the program waits at step S19 until the timer is time-up. when the timer is time-up, the program returns to step S3.

Hereinafter, the processings at the respective steps of step S5 to step S17 are explained briefly.

At step S5, one of a first and second paper feeding inlets is selected, wherein the first inlet is associated with the first paper feeding tray 20 and the second inlet is associated with the second paper feeding tray 22. The detailed description of the processing is made later on.

At step S7, one of the copy magnifications specified as ×0.707, ×0.865, ×1.414, and X 1.000 is selected for a current copying operation. In addition, the copy paper sheet corresponding to the selected magnification is automatically selected as well. The detailed description of the processing is made later on.

At step S9, an optimum copy paper size is automatically selected when the edit. copy mode is selected by the input operation of the key 960. The detailed description of the processing is made later on.

At step S11, a processing corresponding to an operation of the book copy mode is made when the book mode key 91 is operated. The detailed description of the processing is made later on.

At step S13, the LED-elements of the inter-image eraser unit 40 are controlled to be on or off with the timers XA and XB. The detailed description of the processing is made later on.

At step S15, the copying operation is controlled. The detailed description of the processing is made later on.

At step S17, other processings such as inputting of the copy quantity with the ten-key 94 and controlling the driving circuit of the numerical display unit 900 are executed. The detailed description in connection with the above is omitted here since these processings are well-known in the art.

Figure 16:
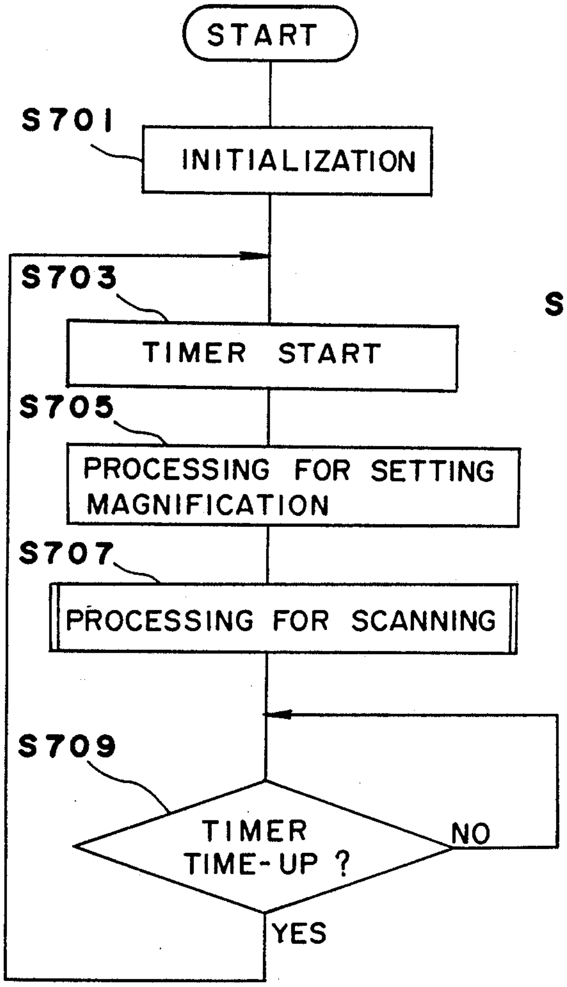
FIG. 16 is a flow-chart showing a main process to be performed by a second CPU.

Next, a flow chart of a main routine executed by the second CPU 202 is explained according to the drawing of FIG. 16. The second CPU 202 initiates processings when, for example, an electric power is first supplied. Subsequently, initialization of the second CPU 202 is made at step S701. Then, an internal timer by which a required time for one routine is controlled is set at step S703, and the processings at respective steps of step S705 to step S707 are executed sequentially. After that, the program waits at step S709 until the timer is time-up. When the timer is time-up, the program returns to step S703. Hereinafter, the processings at the respective steps of step S705 to step S707 are explained briefly.

At step S705, a moving amount and direction of the lens assembly 14 are controlled in response to a signal of setting the copy magnification, wherein the signal is outputted from the first CPU 201. The processing of setting the magnification is well-known in the art, so the detailed description of that is omitted, here.

At step S707, a scanner is controlled in response to a scanning signal outputted from the first CPU 201. This processing is well-known as well, so the detailed description of that is omitted, here.

Figure 17:
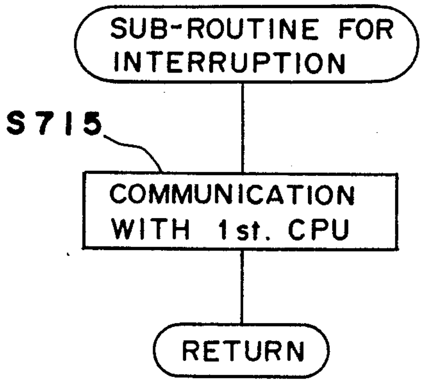
FIG. 17 is a flow-chart showing a sub-routine of an interruption of the second CPU.

The copying machine embodying the present invention has two CPUs 201 and 202. The communication between the two 201 and 202 is effected as follows. The communication with the first CPU 201 is effected by a processing at step S715 of a sub-routine for interruption as shown in FIG. 17 in response to an interruption demanding signal outputted from the first CPU 201, regardless of the execution of the processing of the main routine by the first CPU 201.

Figure 9:
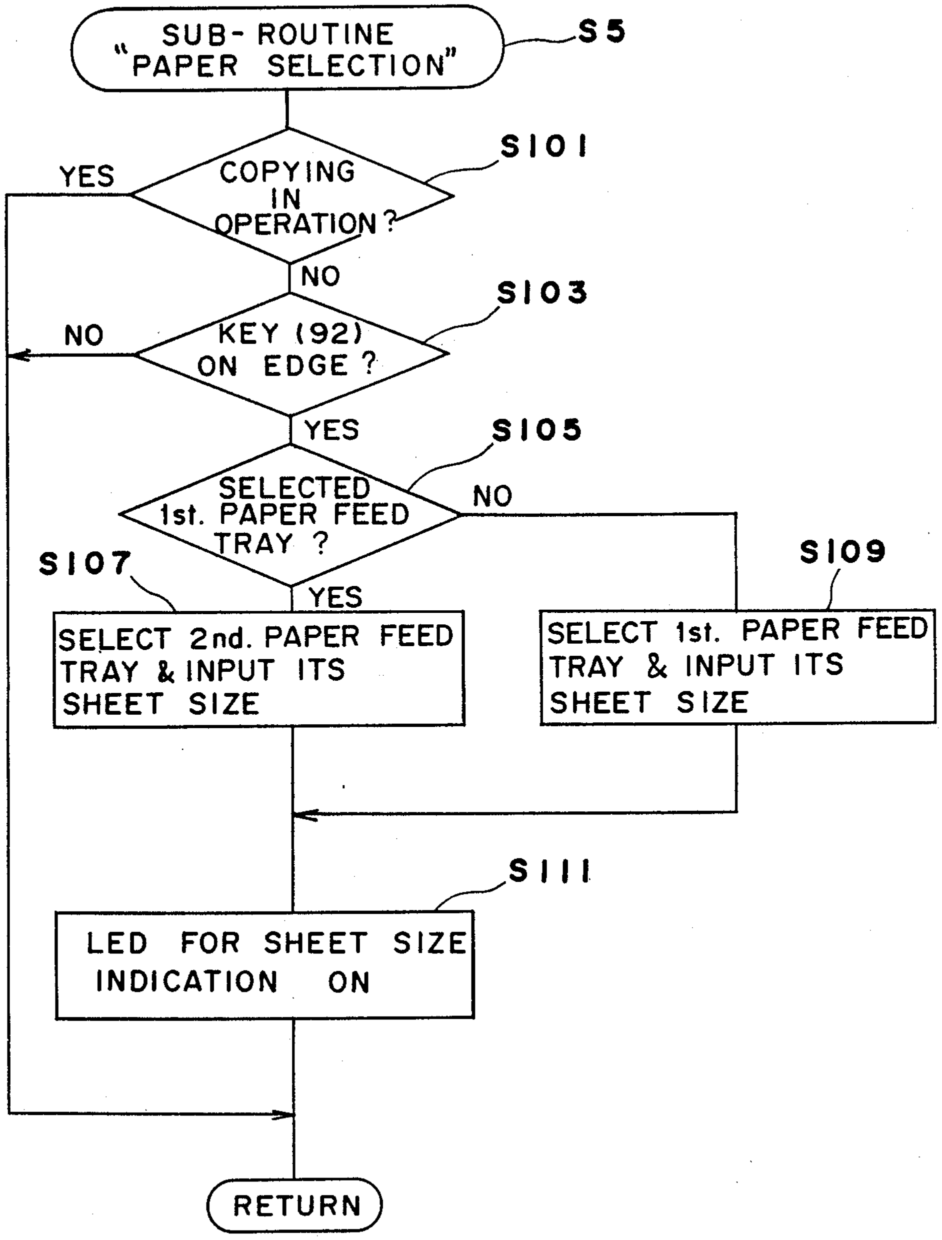
FIG. 9 is a flow-chart showing a sub-routine of paper selection.

Referring now to the drawings of FIG. 9 to FIG. 15, there are shown respective sub-routines executed by the first CPU 201. The processing (paper selecting) at step S5 of FIG. 8 is shown in FIG. 9. In the drawing, it is decided at step S101 whether or not the copying is in operation. When decided that not in operation, the program goes to step S103. When the on-edge of the paper selecting key 92 is detected at step S103, the copy paper sheet accommodated in either the first or second trays 20, 22 is selected at step S105. Namely, when it is detected at step S105 that the first paper feeding tray 20 is selected as well as decided that the key 92 is the on-edge at step S103, the second paper feeding tray 22 is selected and a size of the copy paper sheet accommodated in the second tray 22 is detected by the paper size sensors 605 to 608 and its data is inputted into the first CPU. 201 at step S107. Meanwhile, when it is detected at step S105 that the second paper feeding tray 22 is selected as well as decided that the key 92 is the on-edge at step S103, the first paper feeding tray 0 is selected and a size of the copy paper sheet accommodated in the first tray 20 is detected by the paper size sensors 601 to 604 and its data is inputted into the first CPU. 201, at step S109. And one of the paper size indication LEDs 92*a* to 92*d* is turned on at step S111. Namely, if the A3-size is detected, the LED 92*a* is turned on. Similarly, the B4-size to the LED 92*b*, the A4-size to the LED 92*c*, and the B5 to the LED 92*d*.

Figure 10:
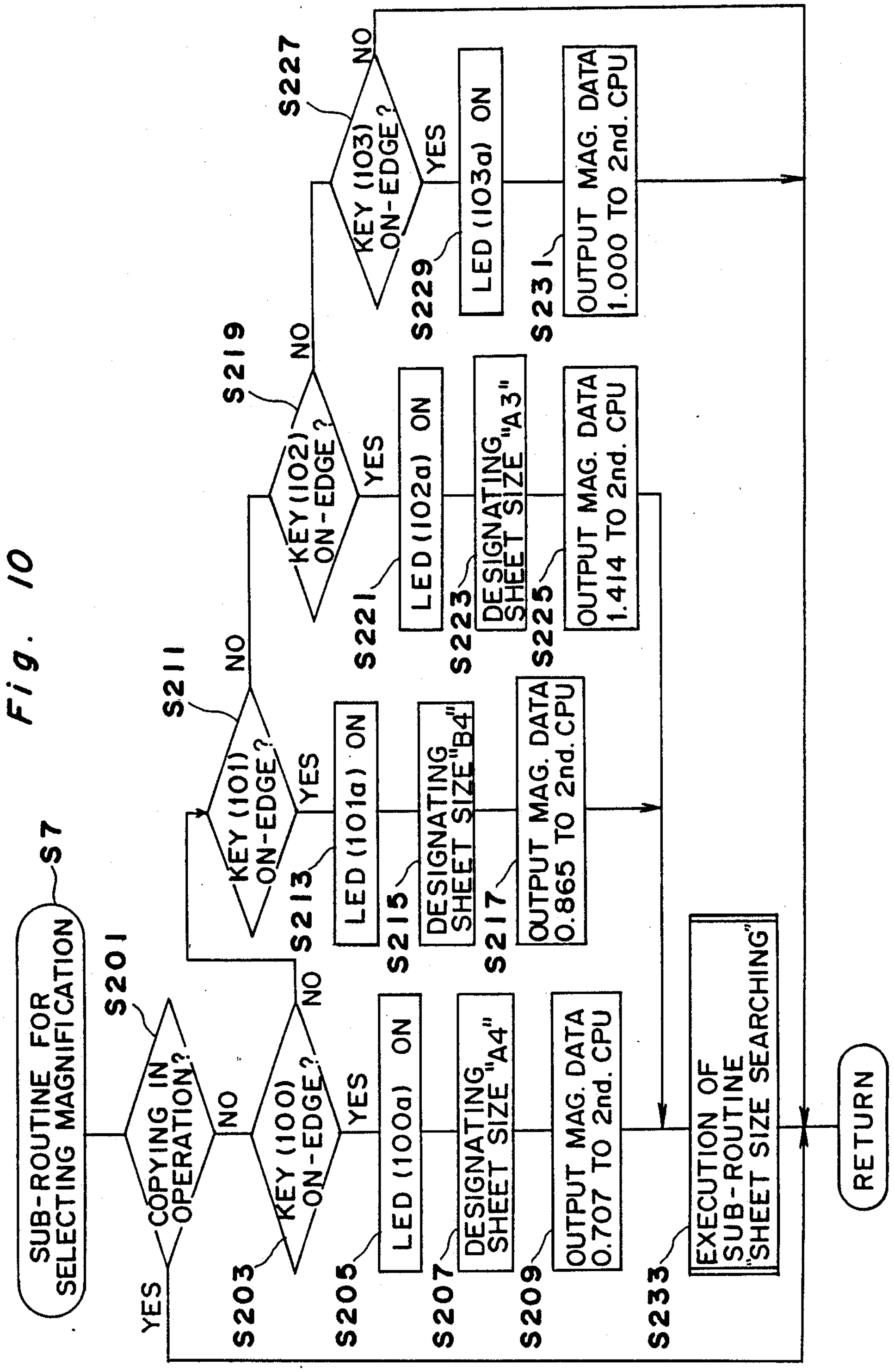
FIG. 10 is a flow-chart showing a sub-routine of magnification selection.

FIG. 10 is a flow chart showing the processing (magnification selection routine) executed at step S7 of FIG. 8. This sub-routine is effected when the machine is not in copying operation. Namely, it is decided at step S201 whether or not the machine is in copying operation. when the machine is in copying operation, the program returns. If the machine is not in copying operation, the program goes to step S203. In the case where the on-edge of either of the magnification selecting keys 100, 101, and 102 is detected at step S203, the copy paper sheet is automatically selected, the size of which is corresponding to the inputted magnification. The relationship between the size and the magnification is as per Table 1 listed below.

TABLE 1

| Magnification | Paper size |
|---|---|
| 0.707 | A4 |
| 0.865 | B4 |
| 1.000 | — |
| 1.414 | A3 |

In Table 1, the reason of correspondence of the 0.707-magnification to the A4-size is that the magnification: ×0.707 is used at the reduction copying from the A3-sized document to the A4-sized copy paper sheet. Similarly, the reason of correspondence of the 0.865-magnification to the B4-size is that the magnification: ×0.865 is used at the reduction copying from the A3-sized document to the B4-sized copy paper sheet. Still further, the reason of correspondence of the 1.414-magnification to the A3-size is that the magnification: ×0.707 is used at the enlargement copying from the A4-sized document to the A3-sized copy paper sheet.

When the on-edge of the magnification selecting key 100 is detected at step S203, the indication LED 100*a* corresponding to this key 100 is turned on. Then, the paper size corresponding to the magnification: ×0.707, i.e., the A4-size, is automatically designated at step S207, and the numerical value of the magnification: ×0.707 is transmitted to the second CPU 202, at step S209, as a signal converted into a magnification setting signal. After that, at step S233, execution of the sub-routine "sheet size searching" which is described later on is made and the program returns.

When the on-edge of the magnification selecting key 101(magnification: ×0.865) or 102(magnification: ×1.414) is detected at step S211 or S219, a similar procedure to that in the case of the key 100 is executed at the steps from step S213 to step S217 or from step S221 to step S225. Consequently, the B4-size and the A3-size are automatically designated, respectively during the executions, as previously described. It is to be noted that the magnification selecting key 103 is a key for the even-magnification(×1.000) so that the paper size may not be designated univocally. Therefore, there is no execution of designating the paper size and the sub-routine "sheet size searching" carried out with the execution of that is not called. The program returns directly after the execution of a signal transmission on the magnification to the second CPU 202 at step S231.

Figure 11:
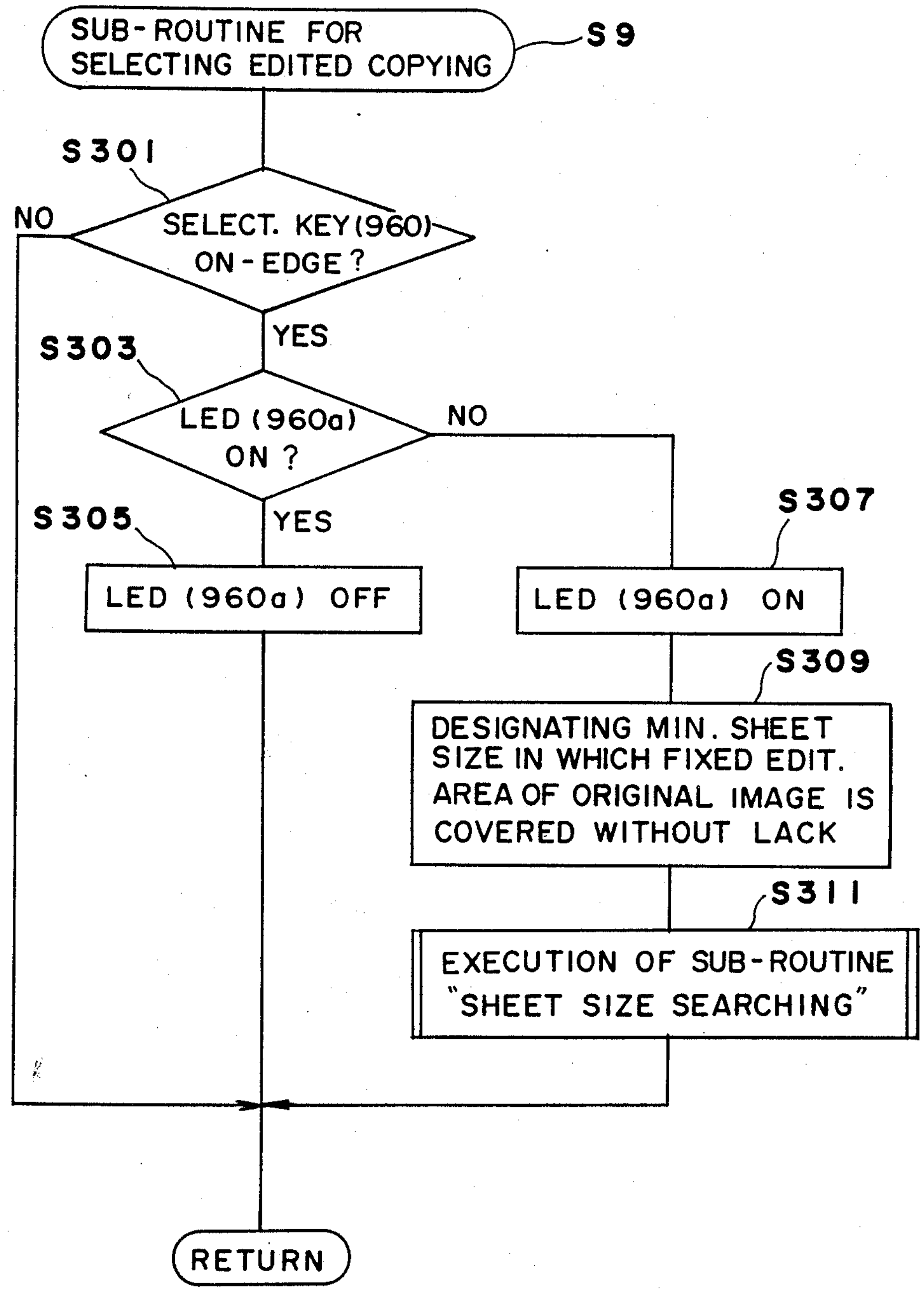
FIG. 11 is a flow-chart showing a sub-routine of selection of edition copying.

FIG. 11 is a flow chart showing the processing (edition copy selection routine) executed at step S9 of FIG. 8. That is, when it is detected at step S301 that the on-edge of the selection key 960 for the edition copy mode, it is detected at step S303 whether or not the indication LED 960*a* is on, i.e., the edition copy mode has been already set on detecting the on-edge. When the LED 960*a* is on, the LED 960*a* is turned off at step S305, so that the edition copy mode is cancelled, then the program returns. On the contrary to the above, in case where it is detected at step S301 that the on-edge of the key 960 as well as it is detected at step S303 that the LED 960*a* is off, i.e., the edition copy mode has not yet been set, the LED 960*a* is turned on at step S307. Thus, the edition copy mode is set. After that, the minimum paper size capable of covering the edited image area determined in advance without lack of the printed image is automatically designated at step S309, wherein the edited image area has been specified by another manner. After designating the paper size, the execution of the sub-routine "sheet size searching", which is described below, is made at step S311 and the program returns.

Figure 12:
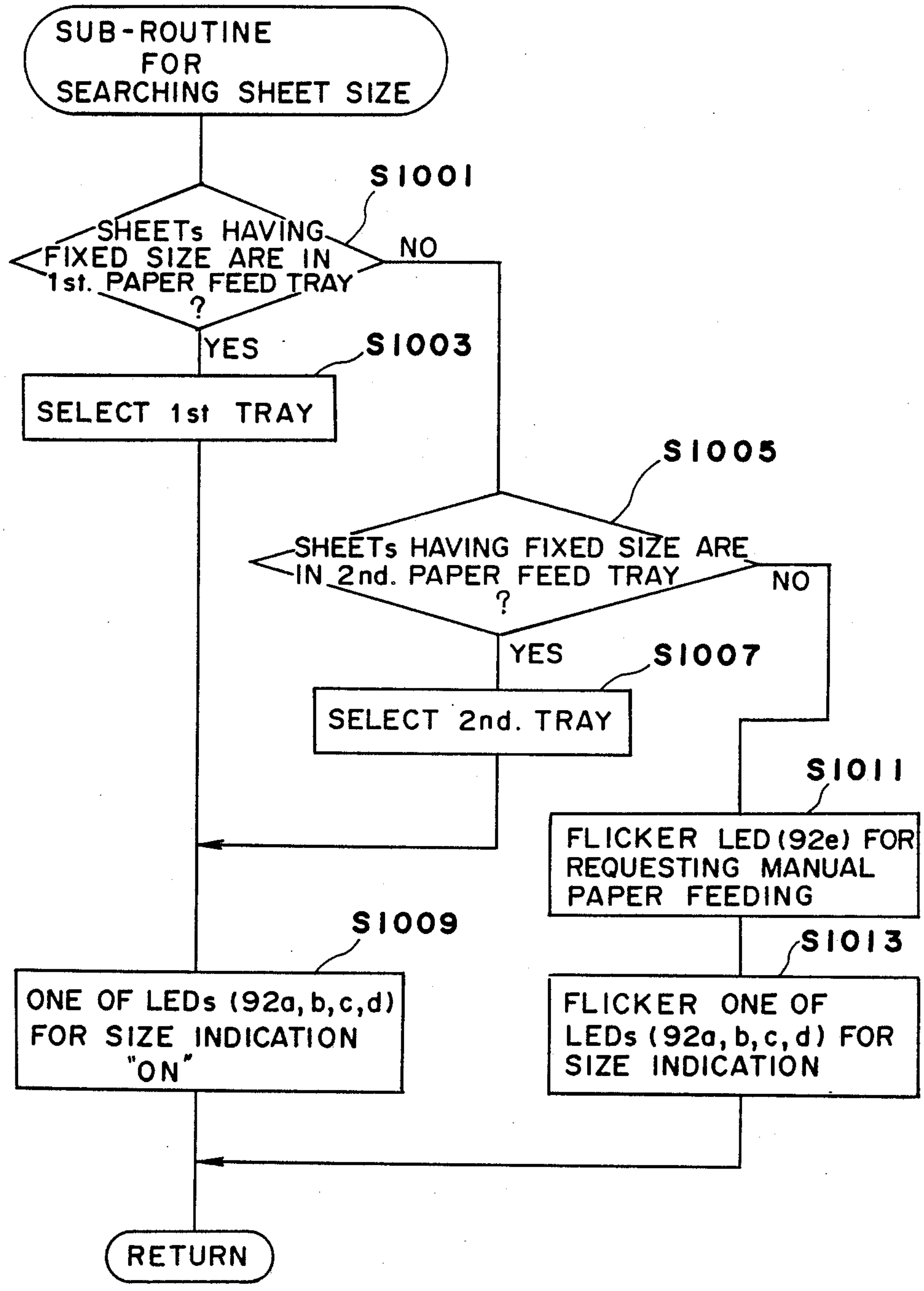
FIG. 12 is a flow-chart showing a sub-routine of paper size searching.

FIG. 12 is a flow chart showing the sub-routine "sheet size searching" which is called in the sub-routine of the processing of the edition copy selection routine described above and the book mode copying routine which is described later on. In this routine, at first, one of the paper feeding trays 20, 22 of the automatic paper feeding device 600 is selected, which accommodates the copy paper sheets having the size which is automatically designated by the above-mentioned routines.

Namely, in case where it is detected at step S1001 that the copy paper sheets, the size of which is automatically designated, are accommodated in the first tray 20 which is mounted at the first paper feeding inlet, the program goes to step S1003 and the first paper feeding tray 20 is selected at step S1003. On the other hand, if it is detected at step S1001 that no copy paper sheets of that size are in the first tray 20 and it is detected at step S1005 that the above-mentioned copy paper sheets are accommodated in the second tray 22 mounted at the second paper feeding inlet, the second paper feeding tray 22 is selected at step S1007. In addition, at step S1009, the indication LED (one of LEDs 92*a*, 92*b*, 92*c*, and 92*d*) for indicating the size, designated automatically, of the copy paper sheet is turned on whereby operators can confirm completion of the automatic paper selection.

Meanwhile, in case where the copy paper sheets having the size which is automatically designated are not able to be fed from neither the first nor second paper feeding tray 20, 22, i.e., it is detected at step S1001 and S1005 that no sheets of that size are in either tray, the program goes to step S1011. At step S1011, the indication LED 92*e* for indicating a request of feeding a copy paper sheet manually is made to flicker whereby, operators are urged so as to carry out the copying operation with manual paper feeding. In addition to the above, the paper size indication LED (one of LEDs 92*a*, 92*b*, 92*c*, and 92*d*) corresponding to the designated size described above is made to flicker at step S1013. In this way, operators can recognize the size of the copy paper sheet to be fed. After completion of the processing described above, the program returns to the original sub-routine by which the above-mentioned sub-routine is called.

Figure 13:
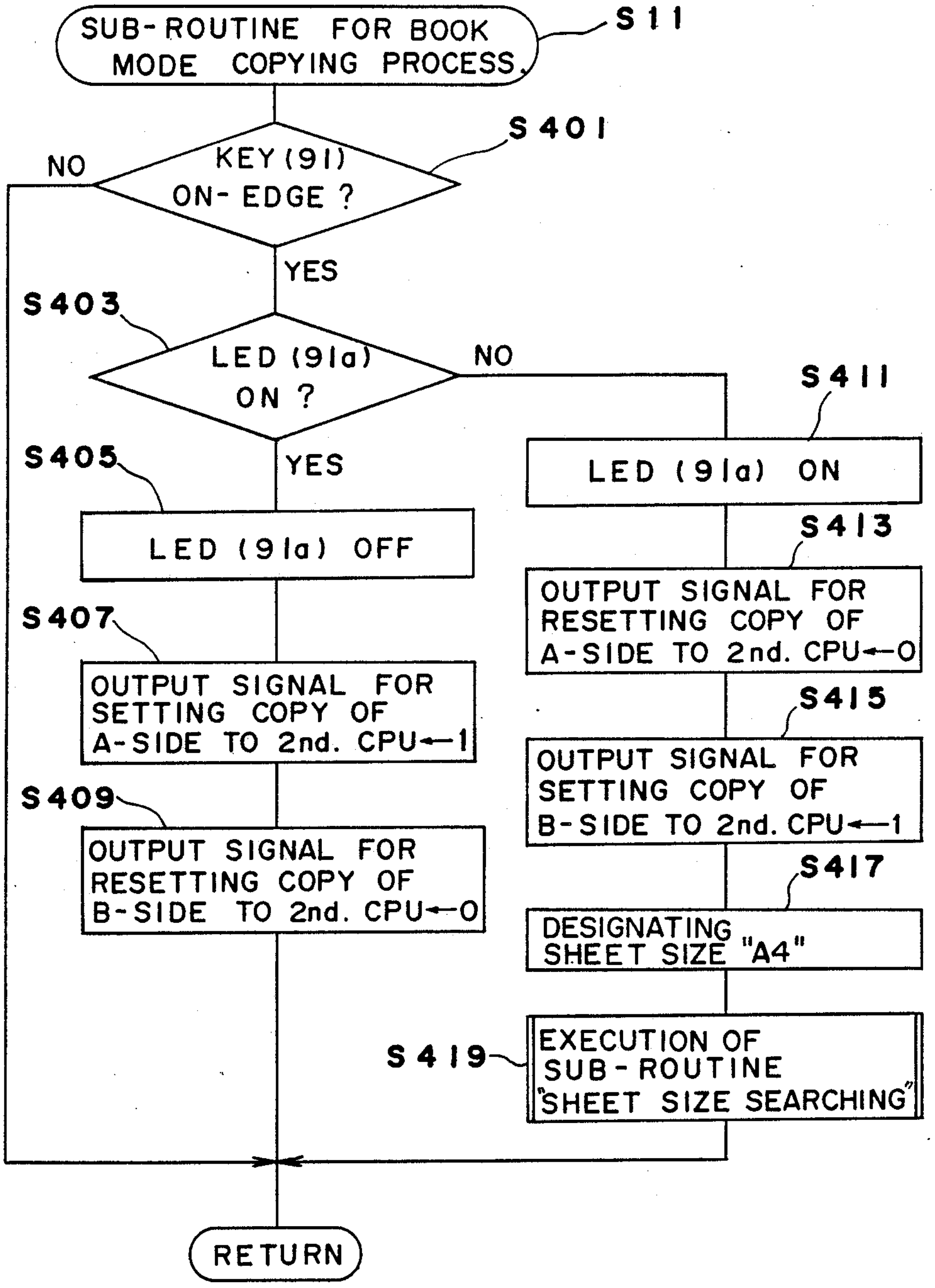
FIG. 13 is a flow-chart showing a sub-routine of a processing of book mode copying.

FIG. 13 is a flow chart showing the processing (book mode copying routine) executed at step S11 of FIG. 8. The processing shown by the flow chart is effected in response to the operation of the book mode key 91. As disclosed in U.S. Pat. No. 4,017,173, the book mode represents that each of two originals set on the platen glass, such as a book which is opened and the like, is reproduced on an individual copy paper sheet.

At first, in case where it is detected at step S403 that the book mode has been already set, i.e., the indication LED 91*a* is on, when the on-edge of the the book mode key 91 is detected at step S401, the program goes to step S405 and the book mode is reset at step S405, so that the LED 91*a* is made off. Then, so as to inform the second CPU 202 that the book mode is under an off-state, a signal for copying an A-side (the A-side represents a side close to a regular position of the scanner; that is, the right-hand portion on the platen glass shown in FIG. 1.) is generated as "1" and transmitted to the second CPU 202 at step S407, besides a signal for copying a B-side ( the B-side represents a side far from the regular position of the scanner; that is the left-hand portion on the platen glass shown in FIG. 1.) is generated as "0" and transmitted to the second CPU 202 at step S409.

Meanwhile, in case where it is detected at step S403 that the book mode is under the off-state, i.e., the indication LED 91*a* is off, when the on-edge of the the book mode key 91 is detected at step S401, the program goes to step S411 and the book mode is set at step S405, so that the LED 91*a* is made on. Then, so as for the second CPU 202 to make the B-side to be scanned at first, the signal for copying the A-side is generated as "0" and transmitted to the second CPU 202 at step S413, besides the signal for copying the B-side is generated as "1" and transmitted to the second CPU 202 at step S415. Further, the A4-size as the paper size is automatically designated at step S417, and the sub-routine "sheet size searching" is called at step S419. After completion of the processings described above, the program returns to the main routine.

Figure 14:
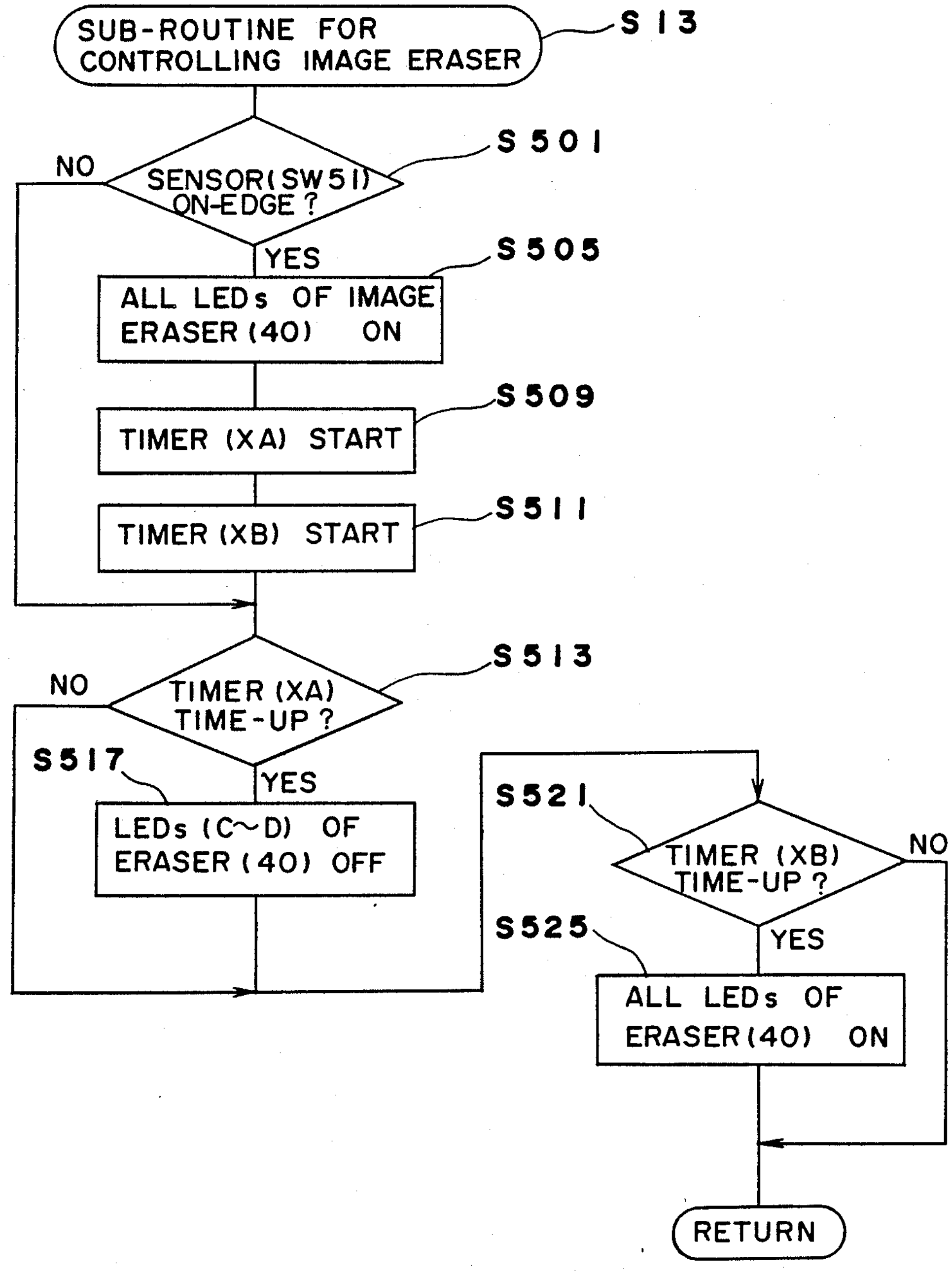
FIG. 14 is a flow-chart showing a sub-routine of controlling of the inter-image eraser unit.

Referring now to the drawing of FIG. 14, there is shown a flow chart for controlling the inter-image eraser unit 40. The controlling is effected as follows. At first, it is detected at step S501 that the detecting sensor SW51 for detecting a timing when a front end of the image of the original which is scanned by the scanner is focused on the photosensitive drum 1 turns to the on-edge. When the on-edge of the detecting sensor SW51 is detected at step S501, the program goes to step S505 and all LEDs comprised of the inter-image eraser unit 40 are turned on at step S505. Further, the timer XA is caused to start at step S509, wherein the timer XA provides the time necessary for the scanner to reach a front end of the edition area for editing the original image (the time is 0 when the edition copy mode is off). Further, the timer XB is caused to start at step S511, wherein the timer XB provides the time necessary for the scanner to reach a rear end of the edition area for editing the original image (the time is a completion time of the scanning to the designated paper size when the edition copy mode is off). When it is detected at step S513 that the timer XA is time-up, the LEDs of the inter-image eraser unit 40, disposed therein correspond to the zone between the left-hand and right-hand edges of the edition area of the original image (refer to the FIG. 4; the LEDs with the symbol of C to D), are turned off at step S517. Whereby, it is enabled to form the electrostatic latent image only in the zone (symbol C to symbol, D shown in FIG. 4) therebetween. After that, when it is detected at step S521 that the timer XB is time-up, all LEDs of the eraser unit 40 are turned on at step S525. By the execution of the processings described above, only the area shown by the oblique lines in FIG. 4 has the latent image. After the execution of all processings described above, the program returns to the main routine.

FIGS. 15A to 15D are flow charts which are divided from one flow chart showing the sub-routine (copying operation routine) executed at step S15 of the main routine (FIG. 8), respectively. At steps from step S601 to step S613 of FIG. 15A, a flag for initiating the copying operation is set. That is, when it is detected at step S601 that the print switch 90 is the on-edge, the initiation flag of copying is set at step S603. Whereby, the copying operation using the copy paper sheets accommodated in the first and second trays 20 and 22 is ready. On the other hand, when the on-edge of the switch 90 is not detected at step S601, the program goes to step S605. Namely, regarding the copying operation using the copy paper sheet set in the manual paper feeding device 650, the following procedures are taken. At first, it is decided at step S605 whether or not the copy paper sheet is detected by the sensor MP1 which is disposed in front of a pair of the paper feed rollers 750 arranged close to the inlet of the manual paper feeder. If the copy paper sheet is detected at step S605 by the sensor MP1, a clutch (not shown) of the manual feed roller 750 is turned on at step S607, whereby feeding of the copy paper sheet is initiated. After that, when the copy paper sheet moves ahead and has passed through the sensor MP1, the sensor MP1 gets into the off-edge, and then the program goes to the step S609. At step S609, it is decided whether or not the copy paper sheet is detected by the sensor MP2 which is disposed behind the paper feed roller 750. When the copy paper sheet is detected at step S609 by the sensor MP2, the clutch of the paper feed roller 750 is turned off at step S611, and then the initiation flag of copying is set at step S613. The location of the sensor MP2 is so considered that the transportation of the copy paper sheet into the copying machine may be smooth and stable.

Figure 15A:
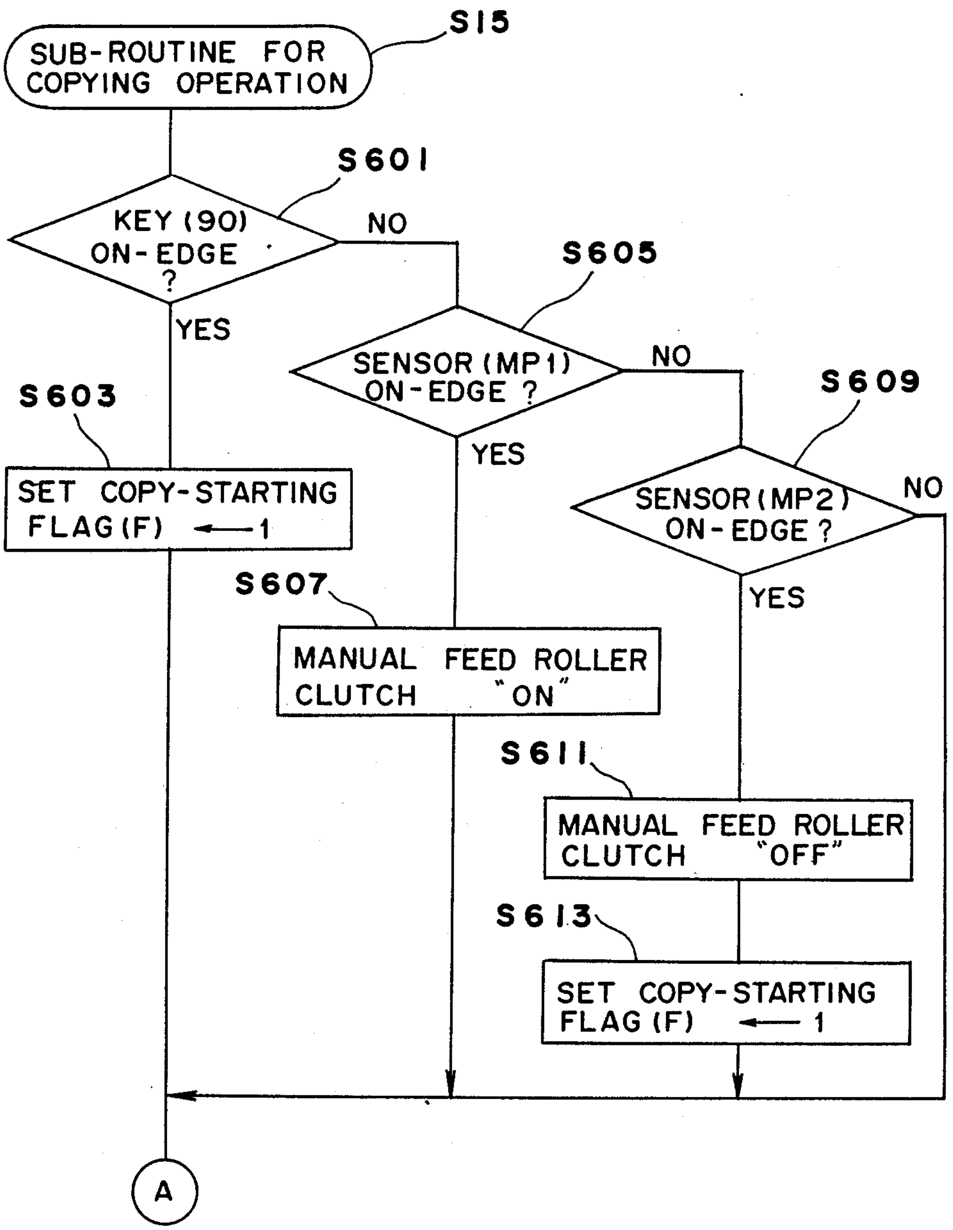
FIGS. 15A throughout 15D are flow-charts showing a sub-routine of a copying operation.
Figure 15B:
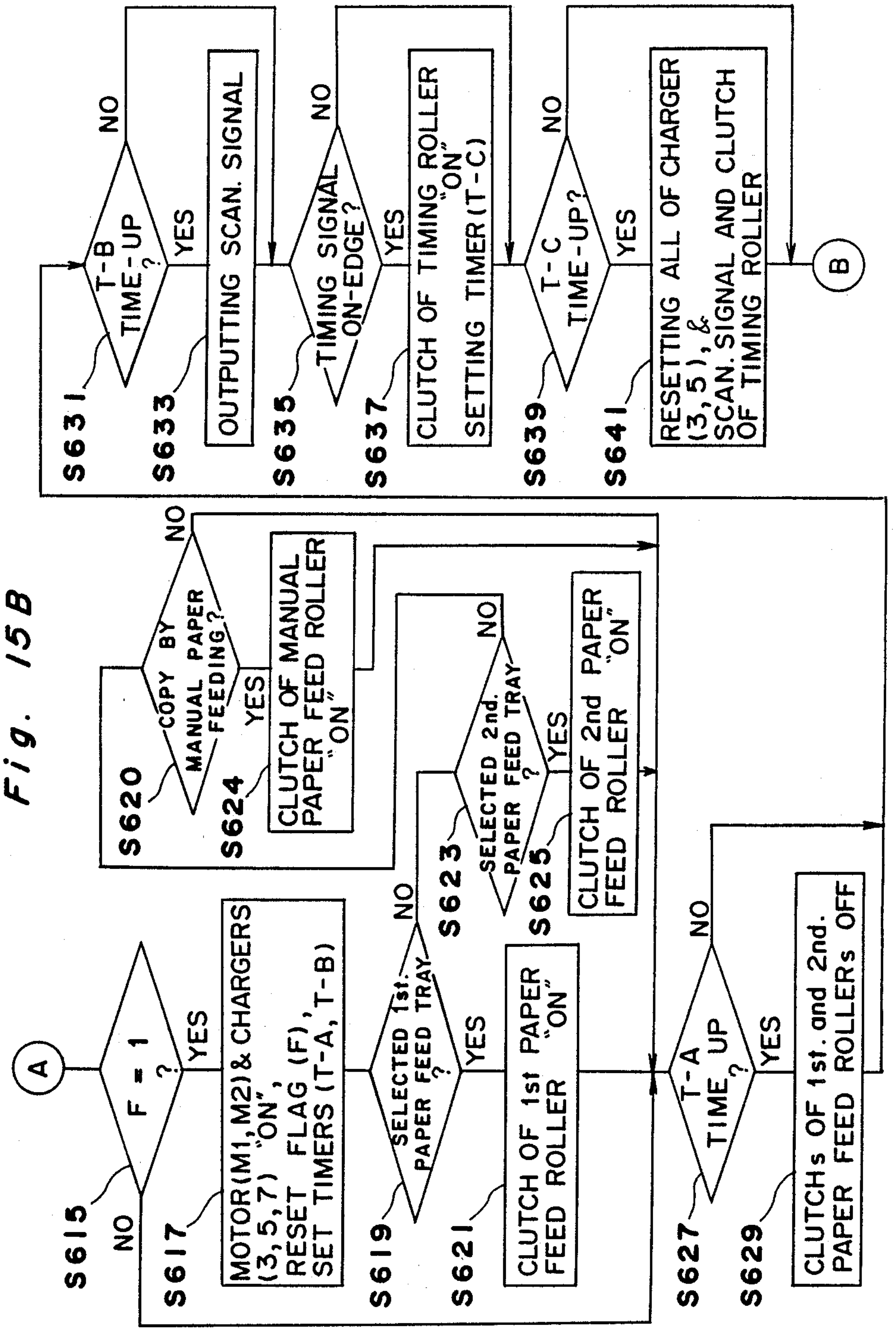

At steps from step S615 to step S633 of FIG. 15B, processings of a first stage of the copying operation are executed after setting the initiation flag of copying. Namely, at step S615, it is decided whether or not the initiation flag is set. When decided at step S615 that the flag is set, the program goes to step S617 and the main motor M1, the developing motor M2, the charger 3, and the transfer charger 7 are, respectively, turned on as well as the initiation flag is reset and a timer T-A and a timer T-B are set at step S617. Further, At step of S619, S623, or S620, one of the automatic paper feeders, i.e., the first or second automatic paper feeders 600A, 600B, or the manual paper feeding device 650 is selected, wherein the selection is effected by the processings of the sub-routine "sheet size searching" (refer to FIG. 12). Namely, if the first tray 20 is internally selected, the program goes to step S621 via step S619. If the second tray 22 is internally selected, the program goes to step S625 via step S619 and step S623. If there are no paper with the designated size in both trays 20 and 22, it is so designed that the manual paper feeding device 650 is selected. In this case, therefore, the program goes to step S624 via step S619, step S623, and step S620. At respective steps of step S621, S625, and S624, clutches (not shown) of the first and second paper feed rollers 771 and 721 and manual paper feed roller 751 are, respectively, turned on. After that, the program waits at step S627 until the timer T-A is time-up. When the timer T-A is time-up, the program goes to step S629 and the clutch of either the first or second paper feed roller 771 or 721 which is in operation is turned off at step S629. Then, the program waits at step S631 until the timer T-B is time-up. When the timer T-B is time-up, the program goes to step S633 and a signal for scanning is generated and outputted to the second CPU 202 at step S633.

At steps from step S635 to step S641, the following processings are carried out in response to a timing signal transmitted from the second CPU 202, wherein the timing signal is generated at the time when the scanner reaches a position located predeterminedly with respect to the original image, as described later on. At first, it is decided whether or not the timing signal is generated. Namely, it is detected at step S635 that the timing signal from the second CPU 202 is generated. When it is detected at step S635 that the on-edge of the timing signal, the program goes to the step S637, and a clutch (not shown) of the timing roller 73 is turned on as well as a timer T-C is set at step S637. Then, the program waits at step S639 until the timer T-C is time-up. When the timer T-C is time-up, the program goes to step S641, and the charger 3 and the clutch of the timing roller 73 are turned off as well as the scanning signal is reset at step S641.

Figure 15C:
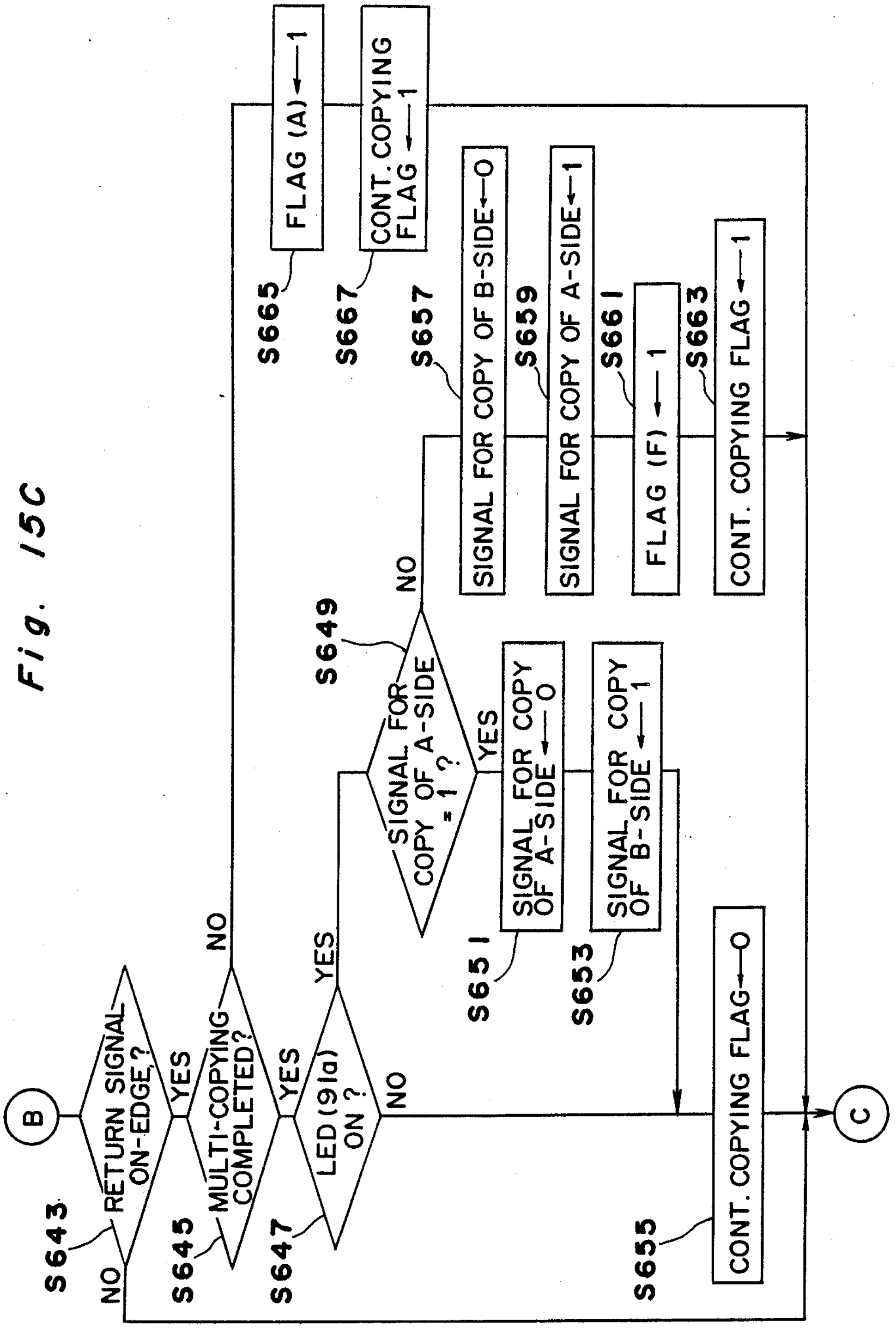

At steps from step S643 to step S667 of FIG. 15C, the following processings are carried out in response to a return signal transmitted from the second CPU 202, wherein the return signal is generated at the time when the scanner reaches its turning point, as described later on. When it is detected at step S643 that the return signal is on-edge, it is decided at step S645 whether or not multi-copying is completed. In case where it is decided at step S645 that the multi-copying is not completed, the program goes to step S665, and the initiation flag for copying is set at step S665 and then a continuous copy flag is set at step S667, whereby the copying operation is effected continuously. On the other hand, in case where it is decided at step S645 that the multi-copying is completed, it is detected at step S647 whether the indication LED 91*a* for indicating that the book mode copy is selected is on or off, Then when it is detected at step S647 that the LED 91*a* is off, i.e., the operation mode is not the book copy mode, the program goes to step S655, and the continuous copy flag is reset at step S655, then the program goes to step S669 of FIG. 15D.

Meanwhile, when it is detected at step S647 that the LED 91*a* is on, in other words, the mode is the book mode, the program goes to step S649, and it is decided at step S649 whether or not the signal for copying the A-side of the book shaped document is generated. When it is decided at step S649 that the A-side copy signal is not generated, i.e., it is "0", the program goes to step S657. This means that a copying operation effected directly before is a last copying operation to the B-side of the document. Accordingly, the signal for copying the B-side to be transmitted to the second CPU 202 is reset at step 657, and the A-side copy signal is set to "1" at step S659, whereby a stand-by state of copying to the A-side is established. Further, the initiation flag (F) is set to "1" at step S661, and the continuous copy flag is set to "1" at step 663, whereby the copying operation is effected continuously.

In case where it is decided at step S649 that the A-side copy signal is generated, i.e., it is "1", the program goes to step 651. This means that a copying operation effected directly before is a last copying operation to the A-side of the document. In other words, all copying operation which was set is completed. Accordingly, the A-side copy signal is reset to "0" at step S651, and the B-side copy signal is set to "1" at step S653, then the continuous copy flag is reset at step S655. After that, the program goes to step S669 of FIG. 15D.

Figure 15D:
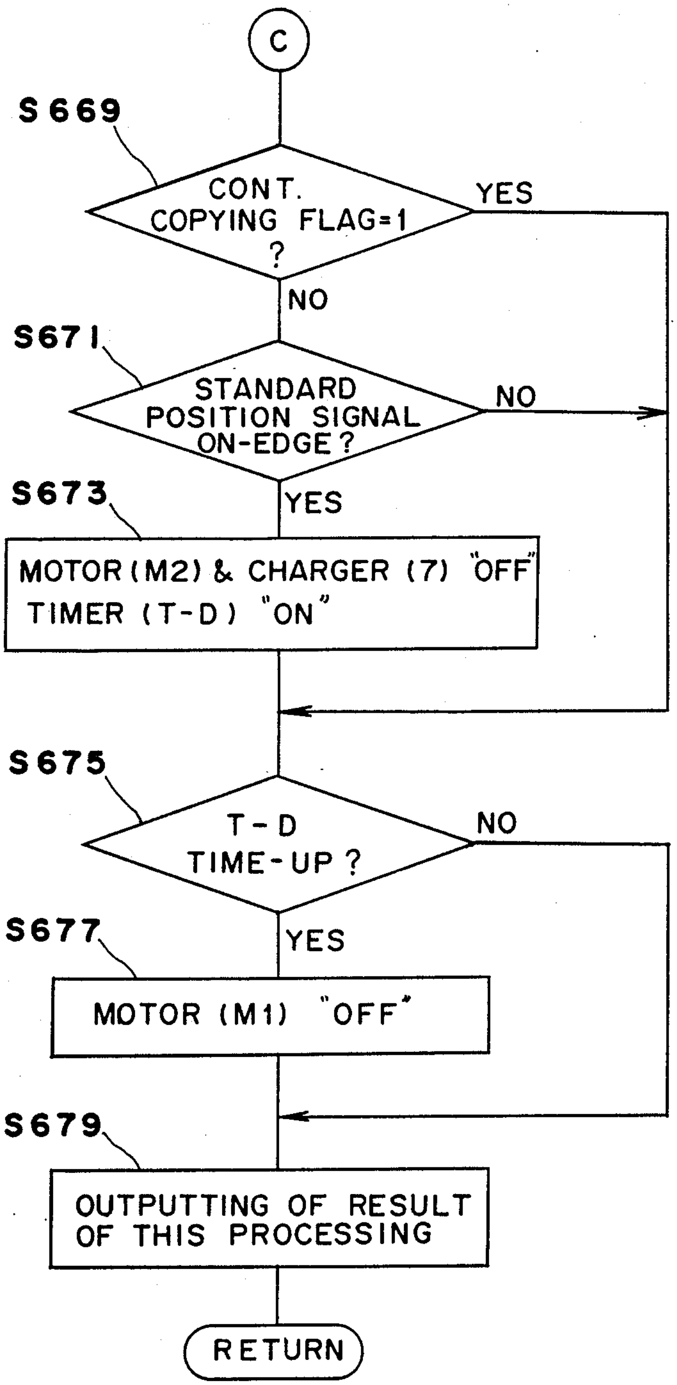

At steps from step S669 to step S677 of FIG. 15D, processings of a last stage of the copying operation are executed. That is, it is decided at step S669 whether or not the continuous copy flag is set to "1". When it is decided at step S669 that the flag is reset to "0", it is decided at step S671 whether or not a signal on a standard position of the scanner from the second CPU 202 is generated. If it is detected at step S671 that the on-edge of that signal, the developing motor M2 and the transfer charger 7 are turned off as well as a timer T-D is set at step S673. When it is detected at step S675 that the timer T-D is time-up, the main motor M1 is turned off at step S677, and results of the foregoing processings are outputted at step S679. Then, the program returns to the main routine.

Figure 18A:
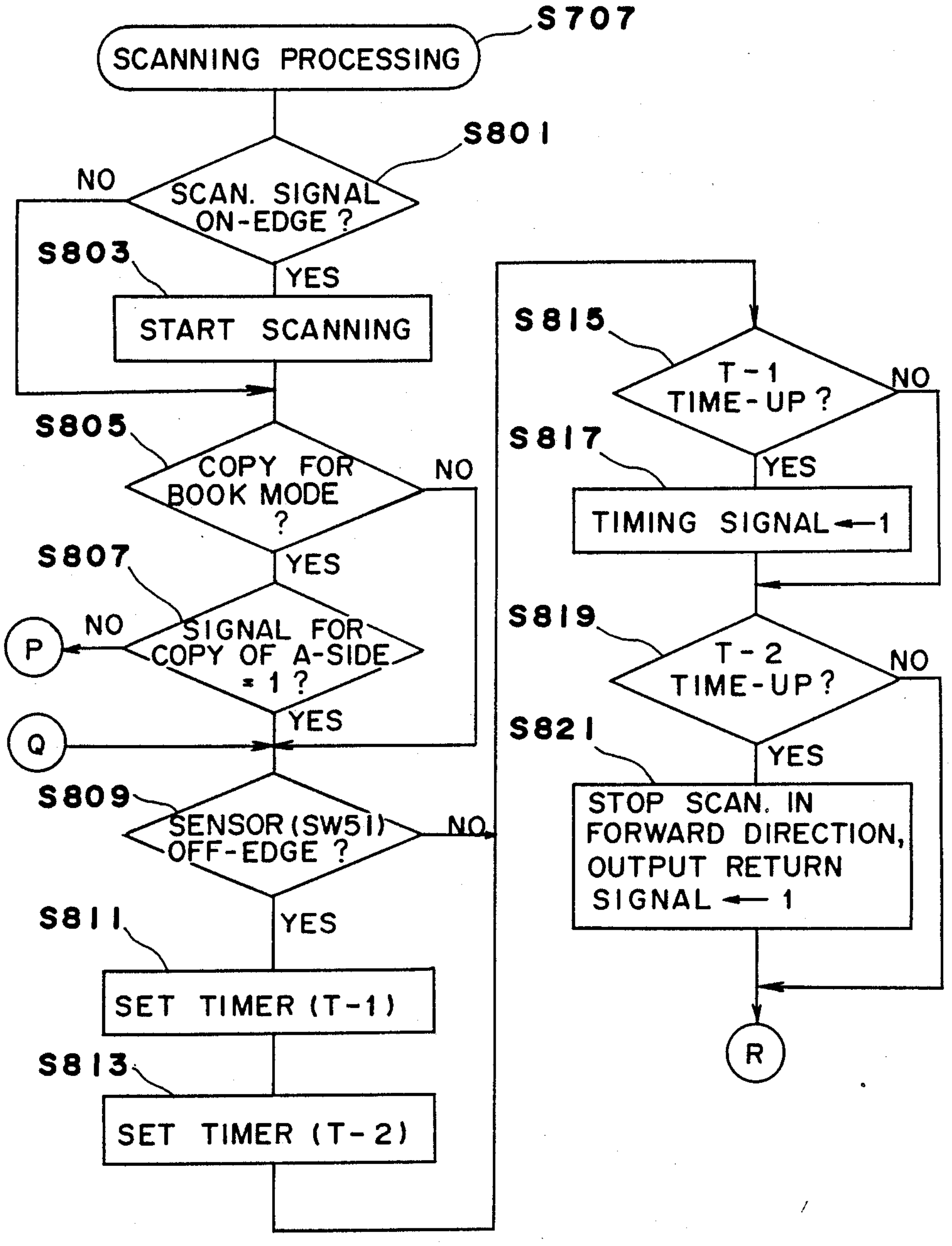
FIGS. 18A and 18B are flow-charts showing a sub-routine of a scanning processing in FIG. 16.
Figure 18B:
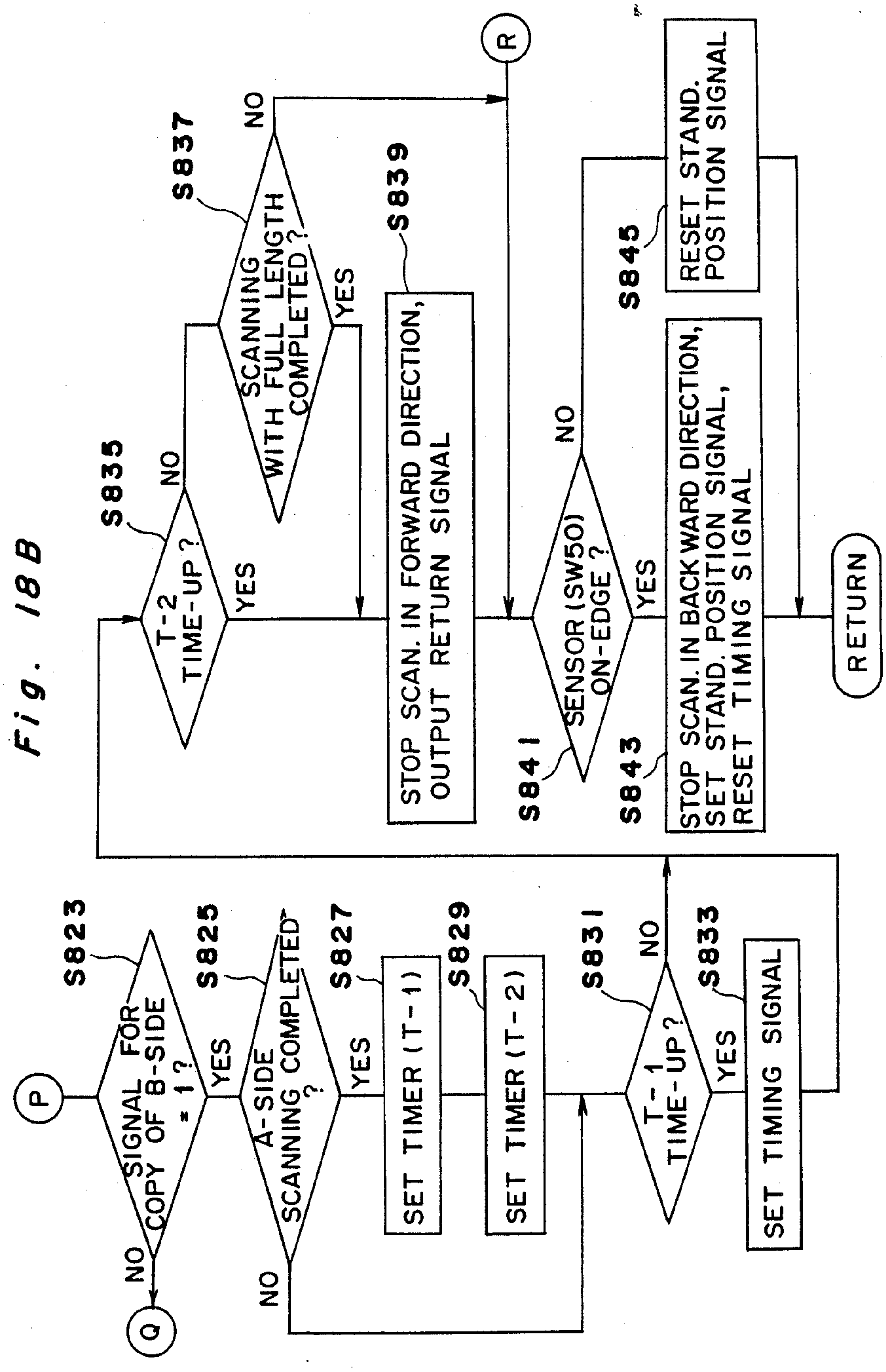

Hereinafter, processings executed by the second CPU 202 are described. At first, scanning processings are explained. FIG. 18A and 18B are flow charts which are divided from one flow chart showing the sub-routine (scanning processings routine) executed at step S707 of the main routine shown in FIG. 16 by the second CPU. The scanning by the scanner is initiated at step S803 under the condition that it is detected at step S801 that the on-edge of the scanning signal is outputted from the first CPU 201. Subsequently, it is decided at step S805 whether or not the operation mode is the book copy mode. If it is decided at step S805 that the mode is not the book copy mode, the program goes to step S809, and when it is detected at step S809 that the on-edge of the sensor SW51, a timer T-1 and a timer T-2 are, respectively, set at respective steps S811 and S813. Namely, the timers T-1 and T-2 are initiated at the time when the scanner reaches a standard position located predeterminedly with respect to the original image. The timer T-1 is set to a required time necessary for the scanner to reach the front end of the original image in the scanning direction, while the timer T-2 is set to a required time necessary for the scanner to reach its turning point. On the occasion of setting the foregoing times, a moving speed of the scanner is taken into account. After that, the program waits at step S815 until the timer T-1 is time-up. When the timer T-1 is time-up, the timing signal is generated at step S817, and the program goes to step S819. At step S819, the program waits until the timer T-2 is time-up, then the movement of the scanner in the forward direction is caused to stop as well as the return signal is generated at step S821 when the timer T-2 is time-up. After that, the program goes to step S841.

Meanwhile, in case where it is decided at step S805 that the mode is the book copy mode, the program goes to step S807, and it is decided at step S807 whether or not the A-side signal is set to "1". If it is decided that the A-side signal is set to "1", i.e., the copying machine is under the state ready for copying the A-side of the original, the program goes to step S809. And the processings same as the above-mentioned are effected from step S809 to step S821. But a setting time of the timer T-2 is given by a time corresponding to a paper sheet length of the original on the A-side.

In case where it is decided, as a result of step S807 described above, that the A-side signal is reset to "0", i.e., not under the state ready for copying the A-side of the original, the program goes to step S823 of FIG. 18B and decision on the B-side signal is effected there. As a result of the decision at step S823, if it is decided that the B-side signal is set to "1", i.e., under the state ready for copying the B-side of the original, the program goes to step S825. The processing at step S823 is to decide whether or not the scanner reaches a standard position (located predeterminedly with respect of the original image of the B-side) for copying to the B-side. This standard position is located at the scanning end (the left side end) of the A-side original. It is decided at step S825 whether or not scanning to the original image of the A-side is completed, wherein the paper sheet length and the copy magnification are taken into account for the operation of scanning. When it is decided that the scanning is completed, in other words, at the time when the scanner reaches the foregoing standard position, the timers T-1 and T-2 are, respectively, set at respective steps S827 and S829. The timer T-1 is set to a required time necessary for the scanner to reach the front end of the original image of the B-side against the scanning direction, while the timer T-2 is set to a required time necessary for the scanner to reach its turning point. After waiting at step S831 until the timer T-1 is time-up, the program goes to step S833, and the timing signal is generated there. Subsequently, after waiting at step S835 until the timer T-2 is time-up, the program goes to step S839, and the movement of the scanner in the forward direction (in the left-hand direction in FIG. 1) is caused to stop as well as the return signal is generated at step S839. Then, the program goes to step S841. If the scanner travels for scanning up to the maximum distance (420 mm; the position of the left-hand end up to which the scanner can travel in FIG. 1), the program goes to step S839 even though the timer T-2 is at work now.

The processings at steps from step S841 to step S845 are processings for controlling the scanner moving in the backward direction so as to stop at its initial position. That is, under the condition that the sensor SW50 is the on-edge which is detected at step S841, the movement of the scanner in the backward direction is controlled to stop, resulting in that the scanner is positioned at its initial position, as well as the timing signal is reset to "0" and the standard position signal is set to "1" at step S843. If the decision made at step S841 is "NO", the standard position signal is kept in the off-state at step S845 until the decision changes from "NO" to "YES". The program returns to the main routine after execution of the above-mentioned processings.

In the embodiment described above, the copying machine has a system controlling that the paper size is automatically designated, based on the data of the TABLE 1, on selection of the copy magnification. The data of the TABLE 1, however, are not the stationary ones. Namely, the data can be altered optionally upon the users' desire. For example, a TABLE 2 listed below may be applied instead of the TABLE 1.

TABLE 2

| Magnification | Paper size |
|---|---|
| 0.707 | B5 |
| 0.865 | B5 |
| 1.000 | — |
| 1.414 | B4 |

Further, it may be so designed that it is possible to select the TABLE 1 or the TABLE 2 by means of an operation of the ten-keys unit. For instance, when selecting the TABLE 1, an operator, depresses the key of the number "9" ten times, then he depresses the key of the number "1", resulting in that he gets the TABLE 1. Or when depressing the key of the number "2" after ten-times depression to the key of the number "9", the TABLE 2 is given to the operator.

In the aforementioned embodiment, the copy paper sheet with the A4-size is automatically designated when the book copy mode is selected. Of course, however, it does not matter that the copy paper sheet with the B5-size is automatically selected at that time.

Still further, when the copy paper sheets, the size of which is automatically designated in response to the selection of the copy magnification, the selection of the book copy mode, or the input of the edition area, are not in neither the first nor second trays, the back-up system to feed the sheet manually by the manual paper feeder is provided for the copying machine as is disclosed in the foregoing embodiment. However, there are other systems available.

Figure 19:
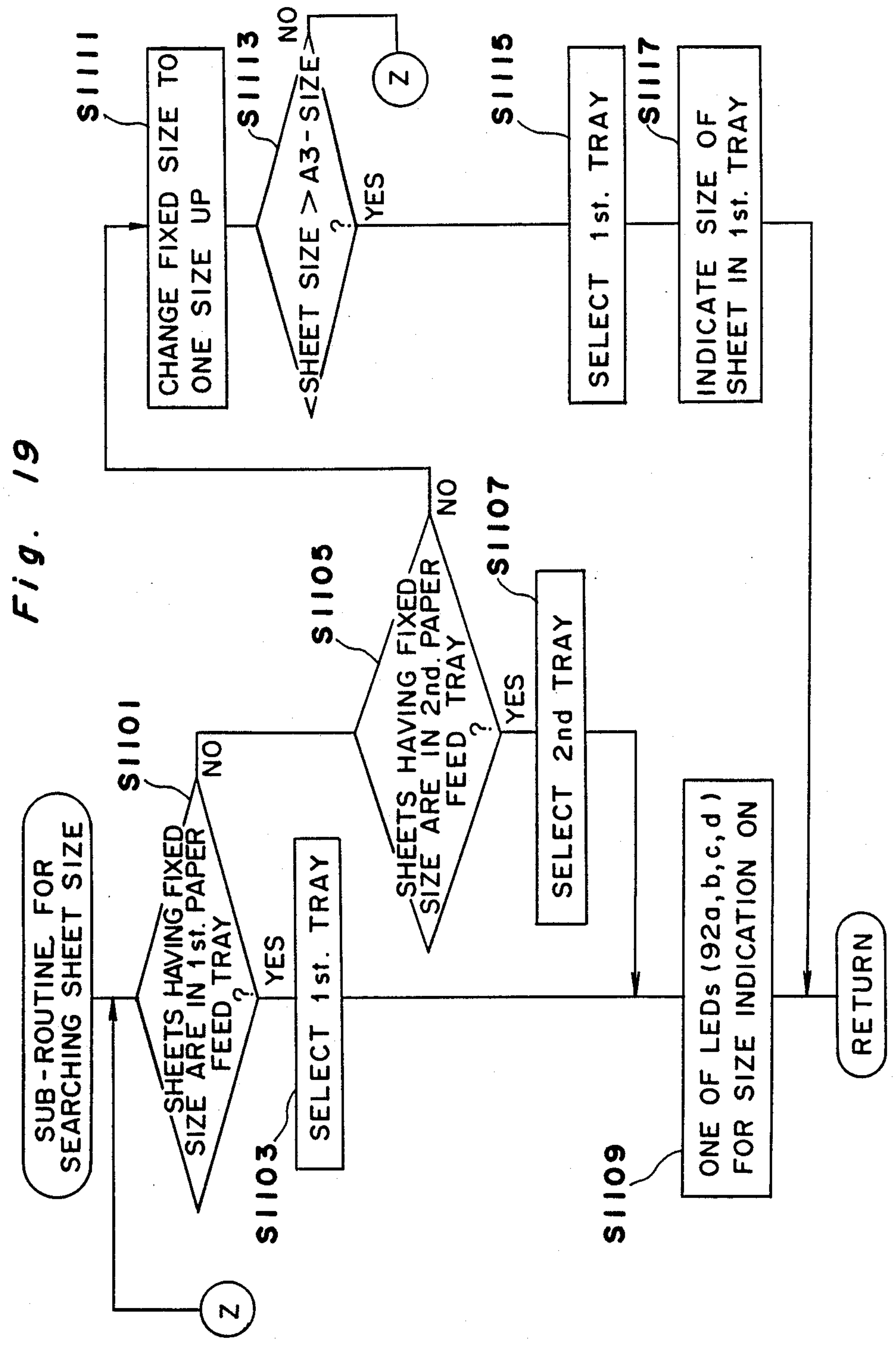
FIG. 19 is a flow-chart showing another sub-routine on "sheet size searching", a processing of which is applicable to the magnification selection, the book mode selection and the edition copying, alternatively.

For example, as shown in FIG. 19, in case where it is detected at respective steps S1101, S1105 that the copy paper sheets, the size of which is automatically designated, are not set in neither the first nor second trays 20 or 22, the designated size is changed to a size with one-upper rank at step S1111. For instance, if the A4-size longitudinally positioned is designated, it is changed to the B4-size longitudinally positioned. Or, if the B4-size, longitudinally is designated, it is changed to A3-size longitudinally positioned, and so on. But, if the size which is changed at step S1111 exceeds the A3-size longitudinally positioned (which is a maximum size to be set in the copying machine), it is detected at step S1113. In such a case, the first tray is forcibly selected at step S1115, and the size of the copy paper sheet accommodated therein is indicated at step S1117. It is to be noted here that other steps except the above in the drawing have processings same as those in FIG. 12. After completion of the processings described above, the program returns to the original sub-routine (the copy magnification routine, or the book copy mode routine) by which the above-mentioned sub-routine is called.

Furthermore, if the copy paper sheets, the size of which is automatically designated, are not in neither the first nor second trays 20, 22 on the edition mode, it does not matter that the edition mode may be reset. Such a control procedure is disclosed hereinafter.

Figure 20:
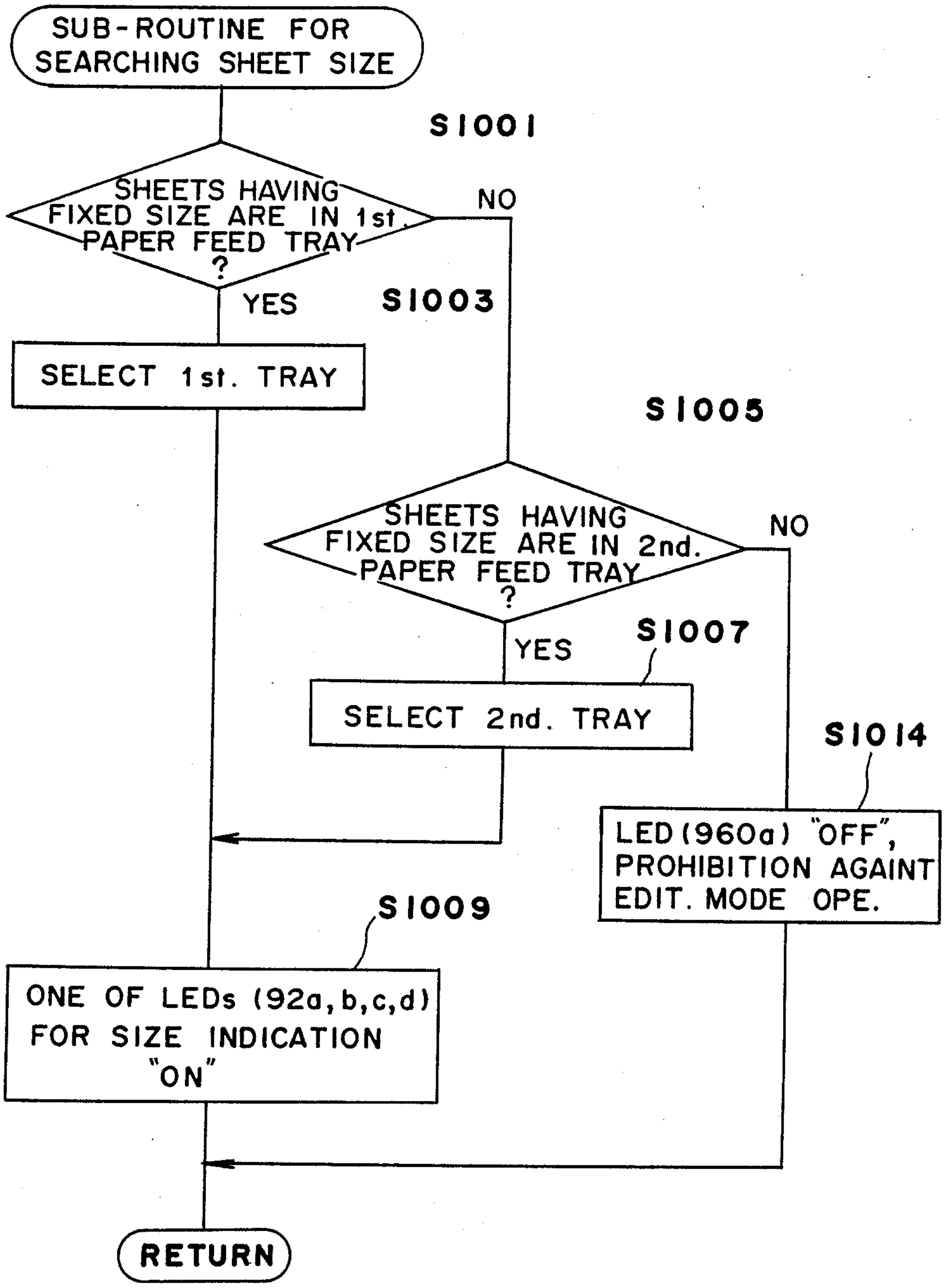
FIG. 20 is a flow-chart showing still another sub-routine on "sheet size searching", a processing of which is applicable to the edition copying, alternatively.

More specifically, as shown in FIG. 20, if it is detected at step 1001 that the copy paper sheets, the size of which is automatically designated, are in the first tray 20, the first tray 20 is selected at step S1003, while the second tray 22 is selected at step S1007 if it is detected at step 1005 that the above-mentioned sheets are in the second tray 22. In addition, at step S1009, the indication LED (one of LEDs 92*a*, 92*b*, 92*c*, and 92*d*) for indicating the size, designated automatically, of the copy paper sheet is turned on whereby, operators can confirm completion of the automatic paper selection. Meanwhile, in case where the copy paper sheets having the size which is automatically designated are not in neither the first nor second tray 20, 22, i.e., it is detected at step S1001 and S1005 that no sheets are in both trays, the program goes to step S1014. At step S1014, the indication LED 960*a* is turned off and the program prohibits the CPU from receiving an order of the edition mode. Accordingly, the copying machine is prohibited from copying under the edition mode when the optimum copy paper sheets are not available therein, resulting in that unsuitable copying is effectively avoided.

Although the present invention has been fully described by way of example with reference to the accompanying drawings, it is to be noted, here, that various changes and modifications will be apparent to those skilled in the art. Therefore, unless otherwise such changes and modifications depart from the scope of the present invention, they should be construed as included therein.

What is claimed is:

1. A copying apparatus comprising:
image forming means capable of forming an image of an original document at a plurality of copying magnifications which are correlated with predetermined copy paper sizes, respectively;
a plurality of paper feeding means, each of which accommodates the copy paper sheets the sizes of which are different from each other;
first selection means for manually selecting one of the copying magnifications; and
second selection means for automatically selecting one of said paper feeding means in which the copy paper sheets having the size correlated with the copying magnification selected by said first selection means are accommodated, wherein the selection of said paper feeding means is effected, regardless of a size of the original document, in response to the selection of the copying magnification.

2. A copying apparatus comprising:
image forming means having a plurality of copying modes;
first paper feeding means including a plurality of paper feeding units, each of which accommodates copy paper sheets, for automatically feeding the copy paper sheet therein to said image forming means one by one in response to a signal of paper feeding;
second paper feeding means for feeding a copy paper sheet to be manually set therein to said image forming means;
first selection means for manually selecting one of the copying modes;
sheet size designating means for designating a copy paper size which is correlated with the copying mode selected by said first selection means;
second selection means for automatically selecting one of said paper feeding units in which the copy paper sheets with the size designated by said sheet size designating means are accommodated; and
indication means for indicating a request of setting a copy paper sheet at said second paper feeding means when no copy paper sheet with the size designated by said sheet size designating means is in said first paper feeding means.

3. A control method for controlling an operation of a copying apparatus having automatic paper feeding means and manual paper feeding means, comprising the steps of:
selecting a copying mode;
designating a copy paper size which is correlated with the selected copying mode;
selecting said automatic paper feeding means for paper feeding if there is a copy paper sheet with the designated copy paper size in said automatic paper feeding means; and
indicating a request of setting a copy paper sheet at said manual paper feeding means if no copy paper sheet with the designated size is in said automatic paper feeding means.

4. A copying apparatus comprising:
image forming means capable of forming an image of an original document at a plurality of copying magnifications;
first paper feeding means including a plurality of paper feeding units, each of which accommodates copy paper sheets, for automatically feeding the copy paper sheet therein to said image forming means one by one in response to a signal of paper feeding;

second paper feeding means for feeding a copy paper sheet to be manually set therein to said image forming means;

first selection means for manually selecting one of the plurality of copying magnifications;

sheet size designating means for designating a copy paper size which is predeterminedly correlated with the copying magnification selected by said first selection means, wherein the selection of the copying magnification is effected, regardless of the size of an original document, in response to the selection of the copying magnification;

second selection means for automatically selecting one of said paper feeding units in which the copy paper sheets with the size designated by said sheet size designating means are accommodated; and indication means for indicating a request of setting a copy paper sheet at said second paper feeding means when no copy paper sheet with the size designated by said sheet size designating means is in said first paper feeding means.

5. A control method for controlling an operation of a copying apparatus having automatic paper feeding means and manual paper feeding means, comprising the steps of:

selecting a copying magnification;

designating a copy paper size which is correlated with the selected copying magnification;

selecting said automatic paper feeding means if there is a copy paper sheet with the designated size in said automatic paper feeding means; and indicating a request of setting a copy paper sheet at said manual paper feeding means if mo copy paper sheet with the designated size is in said automatic paper feeding means.

6. A copying apparatus comprising:

a document platen on which an original document is positioned for copying;

image forming means having a first copying mode and a second copying mode, the first copying mode representing that an image of the original document on said platen is formed onto a copy paper sheet and the second copying mode representing that each image of two original documents on said platen is formed onto an individual copy paper sheet;

first paper feeding means including a plurality of paper feeding units, each of which accommodates copy paper sheets, for automatically feeding the copy paper sheet therein to said image forming means one by one in response to a signal of paper feeding;

second paper feeding means for feeding a copy paper sheet to be manually set therein to said image forming means;

first selection means for manually selecting one of the first copying mode and the second copying mode;

sheet size designating means for designating a specified copy paper size in response to the selection of the second copying mode, regardless of the size of the original document;

second selection means for automatically selecting one of said paper feeding units in which the copy paper sheets with the size designated by said sheet size designating means are accommodated; and indication means for indicating a request of setting a copy paper sheet at said second paper feeding means when there is no copy paper sheet with the size designated by said sheet size designating means in said first paper feeding means.

7. A control method for controlling an operation of a copying apparatus having automatic paper feeding means and manual paper feeding means and capable of operating with a first copying means and a second copying mode, the first copying mode representing that an image of an original document on a document platen is formed onto a copy paper sheet and the second copying mode representing that each image of two original documents on said platen is formed onto an individual copy paper sheet, comprising the steps of:

designating a specified copy paper size when the second copying mode is selected;

selecting said automatic paper feeding means if the copy paper sheet with the designated size is in said automatic paper feeding means; and indicating a request of setting a copy paper sheet at said manual paper feeding means if no copy paper sheet with the designated size is in said automatic paper feeding means.

8. A copying apparatus comprising;

a document platen on which an original document is positioned for copying;

area assignation means for assigning an optional area in the document positioned on said platen;

image forming means capable of forming an image of the assigned area;

first paper feeding means including a plurality of paper feeding units, each of which accommodates copy paper sheets, for automatically feeding the copy paper sheet therein to said image forming means one by one in response to a signal of paper feeding;

second paper feeding means for feeding a copy paper sheet to be manually set therein to said image forming means;

sheet size designating means for designating a copy paper size which corresponds to the assigned area;

selection means for automatically selecting one of said paper feeding units in which the copy paper sheets with the size designated by said sheet size designating means are accommodated; and indication means for indicating a request of setting a copy paper sheet with said second paper feeding means when no copy paper sheet with the size designated by said sheet size designating means is in said first paper feeding means.

9. A control method for controlling an operation of a copying apparatus having automatic paper feeding means and manual paper feeding means and capable of copying an image of an optional area in an original document, comprising the steps of:

assigning the optional area of the original document;

designating a copy paper size which corresponds to the assigned area;

selecting said automatic paper feeding means if there is a copy paper sheet with the designated size in said automatic paper feeding means; and indicating a request of setting a copy paper sheet at said manual paper feeding means if no copy paper sheet with the designated size is in said automatic paper feeding means.

10. A copying apparatus comprising:

image forming means having a plurality of copying modes;

paper feeding means including a plurality of paper feeding units, each of which accommodates copy paper sheets, for automatically feeding the copy paper sheet therein to said image forming means one by one in response to a signal of paper feeding;

first selection means for manually selecting one of the copying modes;

first designating means for designating a first copy paper size, on the basis of a first rule, in response to the selection of the copying mode;

second designating means for designating a second copy paper size on the basis of a second rule when no copy paper sheet with the first size is in said paper feeding means; and second selection means for automatically selecting one of said paper feeding units in which the copy paper sheets with the designated size are accommodated.

11. A control method for controlling an operation of a copying apparatus having a plurality of paper feeding units, comprising the steps of:

selecting a copying mode;

designating a first copy paper size, which corresponds to the selected copying mode, on the basis of a first rule;

designating a second copy paper size, which corresponds to the selected copying mode, on the basis of a second rule when no copy paper sheet with the first size is in said paper feeding units; and selecting automatically one of said paper feeding units in which the copy paper sheets with the designated size are accommodated.

12. A copying apparatus comprising:

image forming means capable of forming an image of an original document at a plurality of copying magnifications;

paper feeding means including a plurality of paper feeding units, each of which accommodates copy paper sheets, for automatically feeding the copy paper sheet therein to said image forming means one by one in response to a signal of paper feeding;

first selection means for manually selecting one of the copying magnifications;

first designating means for designating a first copy paper size, on the basis of a first rule, in response to the selection of the copying magnification;

second designating means for designating a second copy paper size on the basis of a second rule when no copy paper sheet with the first size is in said paper feeding means; and second selection means for automatically selecting one of said paper feeding units in which the copy paper sheets with the designated size are accommodated.

13. A control method for controlling an operation of a copying apparatus having a plurality of paper feeding units, comprising the steps of:

selecting a copying magnification;

designating a first copy paper size, which corresponds to the selected copying magnification, on the basis of a first rule;

designating a second copy paper size, which corresponds to the selected copying magnification, on the basis of a second rule when no copy paper sheet with the first size is in said paper feeding units; and selecting automatically one of said paper feeding units in which the copy paper sheets with the designated size are accommodated.

14. A copying apparatus comprising:

a document platen on which an original document is positioned for copying;

image forming means having a first copying mode and a second copying mode, the first copying mode representing that an image of the original document on said platen is formed onto a copy paper sheet and the second copying mode representing that each image of two original documents on said platen is formed onto an individual copy paper sheet;

paper feeding means including a plurality of paper feeding units, each of which accommodates copy paper sheets, for automatically feeding the copy paper sheet therein to said image forming means one by one in response to a signal of paper feeding;

first selection means for manually selecting one of the first copying mode and the second copying mode;

first designating means for designating a specified copy paper size on the basis of a first rule in response to the selection of the second copying mode, regardless of a size of the original document;

second designating means for designating a copy paper size on the basis of a second rule when no copy paper sheet with the size designated by the first designating means is in said paper feeding means; and second selection means for automatically selecting one of said paper feeding units in which the copy paper sheets with the designated size are accommodated.

15. A control method for controlling an operation of a copying apparatus having a plurality of paper feeding units and capable of operating with a first copying mode and a second copying mode, the first copying mode representing that an image of an original document on a document platen is formed onto a copy paper sheet and the second copying mode representing that each image of the two original documents on said platen is formed onto an individual copy paper sheet, comprising the steps of:

designating a first copy paper size when the second copying mode is selected;

designating a second copy paper size when there is no copy paper sheet with the first size in said paper feeding units; and selecting one of said paper feeding units in which the copy paper sheets with the designated size are accommodated.

16. A copying apparatus comprising;

a document platen on which an original document is positioned for copying;

area assignation means for assigning an optional area in the original document on said platen;

image forming means capable of forming an image of the assigned area;

paper feeding means including a plurality of paper feeding units, each of which accommodates copy paper sheets, for automatically feeding the copy paper sheet therein to said image forming means one by one in response to a signal of paper feeding;

first designating means for designating a first copy paper size which corresponds to the assigned area;

second designating means for designating a second copy paper size when no copy paper sheet with the first size is in said paper feeding means; and selection means for automatically selecting one of said paper feeding units in which the copy paper sheets with the designated size are accommodated.

17. A control method for controlling an operation of a copying apparatus having a plurality of paper feeding units and capable of copying an image of an optional area in an original document, comprising the steps of:

assigning the optional area of the original document;

designating a first copy paper size which corresponds to the assigned area;

designating a second copy paper size if no copy paper sheet with the first size is in said paper feeding units; and selecting one of said paper feeding units in which the copy paper sheets with the designated size are accommodated.

18. A copying apparatus comprising;

a document platen on which an original document is positioned for copying;

area assignation means for assigning an optional area in the original document on said platen;

image forming means capable of forming an image of the original document with a first mode and a second mode, the first mode representing to form the image of the whole original document and the second mode representing to form the image of the assigned area;

selection means for manually selecting one of the first and second modes;

paper feeding means including a plurality of paper feeding units, each of which accommodates copy paper sheets for automatically feeding the copy paper sheet therein to said image forming means one by one in response to a signal of paper feeding;

sheet size designating means for designating a copy paper size which corresponds to the assigned area when the second mode is selected; and control means for controlling the apparatus so as to cancel the second mode when no copy paper sheet with the designated size is in said paper feeding units.

* * * * *

UNITED STATES PATENT AND TRADEMARK OFFICE

CERTIFICATE OF CORRECTION

PATENT NO. : 4,920,377

DATED : April 24, 1990

INVENTOR(S) : Masazumi Ito and Tomoji Murata

It is certified that error appears in the above-identified patent and that said Letters Patent is hereby corrected as shown below:

In col. 3, line 5, after "accommodated", delete "," (comma).

In col. 4, line 8, delete "that".

In col. 4, line 32, after "copy", delete "," (comma).

In col. 6, line 26, after "in", insert --the main process of--.

In col. 7, line 10, change "adjustment" to --adjustments--.

In col. 7, line 50, after "first", delete "," (comma).

In col. 9, line 27, after "on", delete "," (comma).

In col. 11, line 28, after "two", insert --CPUs--.

In col. 11, line 54, change "0" to --20--.

In col. 11, line 62, after "B5", insert -- -size--.

In col. 14, line 52, change ". Whereby," to --whereby--.

In col. 14, line 54, after "symbol", delete "," (comma).

UNITED STATES PATENT AND TRADEMARK OFFICE
CERTIFICATE OF CORRECTION

PATENT NO. : 4,920,377

DATED : April 24, 1990

INVENTOR(S) : Masazumi Ito and Tomoji Murata

It is certified that error appears in the above-identified patent and that said Letters Patent is hereby corrected as shown below:

In col. 15, line 1, change ".Whereby," to --whereby--.

In col. 16, line 31, after "Then", insert --,-- (comma).

In col. 17, line 67, delete "to".

In col. 18, line 44, after "on", insert --the--.

In col. 18, line 45, delete "the" (second occurrence).

In col. 18, line 60, after "operator", delete "," (comma).

In col. 19, line 20, after "longitudinally", insert --positioned--.

In col. 19, line 49, after "whereby", delete "," (comma).

In col. 22, line 11 (claim 7, line 4), change "means" to --mode--.

UNITED STATES PATENT AND TRADEMARK OFFICE
CERTIFICATE OF CORRECTION

PATENT NO. : 4,920,377

DATED : April 24, 1990

INVENTOR(S) : Masazumi Ito and Tomoji Murata

It is certified that error appears in the above-identified patent and that said Letters Patent is hereby corrected as shown below:

In col. 22, line 50 (claim 8, line 24), change "with" to --at--.

Signed and Sealed this

Tenth Day of September, 1991

*Attest:*

HARRY F. MANBECK, JR.

*Attesting Officer*

*Commissioner of Patents and Trademarks*